US011930801B2

(12) United States Patent
Pulkrabek et al.

(10) Patent No.: US 11,930,801 B2
(45) Date of Patent: Mar. 19, 2024

(54) FISHING REEL WITH CONCENTRIC DRIVELINE

(71) Applicant: TrikaUSA Inc., Superior, WI (US)

(72) Inventors: Larry Pulkrabek, Superior, WI (US); Ty Warner, Superior, WI (US)

(73) Assignee: TrikaUSA Inc., Superior, WI (US)

( * ) Notice: Subject to any disclaimer, the term of this patent is extended or adjusted under 35 U.S.C. 154(b) by 212 days.

(21) Appl. No.: 17/473,881

(22) Filed: Sep. 13, 2021

(65) Prior Publication Data

US 2022/0079127 A1    Mar. 17, 2022

Related U.S. Application Data

(60) Provisional application No. 63/144,513, filed on Feb. 2, 2021, provisional application No. 63/078,114, filed
(Continued)

(51) Int. Cl.
*A01K 89/01*      (2006.01)
*A01K 89/015*    (2006.01)
(Continued)

(52) U.S. Cl.
CPC ........ *A01K 89/057* (2015.05); *A01K 89/0182* (2015.05); *A01K 89/0183* (2015.05);
(Continued)

(58) Field of Classification Search
CPC ............ A01K 89/0182; A01K 89/0184; A01K 89/0186; A01K 89/0189; A01K 89/01902;
(Continued)

(56) References Cited

U.S. PATENT DOCUMENTS 4,278,217 A * 7/1981 Blackwell ............ A01K 89/033
                                                                         254/271
4,585,188 A *  4/1986 Sato ..................... A01K 89/015
                                                                         242/299
(Continued)

FOREIGN PATENT DOCUMENTS

JP          H588270 U     12/1993
JP       2001-245564 A     9/2001
(Continued)

OTHER PUBLICATIONS

International Search Report and Written Opinion in PCT/US2021/050118 dated Jan. 21, 2022.
(Continued)

*Primary Examiner* — Emmanuel M Marcelo
(74) *Attorney, Agent, or Firm* — Foley & Lardner LLP

(57) ABSTRACT

A fishing rod assembly includes a rod and a reel assembly. The reel assembly includes a housing, a spool positioned within the housing, the spool configured to rotate about an axis to retrieve or let out a fishing line, a drive mechanism concentric with the axis, the drive mechanism configured to receive rotational kinetic energy from a user and drive the spool to take-up fishing line when a counter-torque provided to the spool by the fishing line is less than a target torque, and a drag mechanism. The drag mechanism is configured to be driven by the drive mechanism and at least one of (a) drive the spool to take-up the fishing line when the counter-torque provided to the spool by the fishing line is less than the target torque or (b) provide a drag force to the spool when the counter-torque provided to the spool by the fishing line is less than the target torque.

20 Claims, 11 Drawing Sheets

Related U.S. Application Data on Sep. 14, 2020, provisional application No. 63/078,103, filed on Sep. 14, 2020, provisional application No. 63/078,108, filed on Sep. 14, 2020.

(51) Int. Cl.
*A01K 89/027* (2006.01)
*A01K 89/033* (2006.01)

(52) U.S. Cl.
CPC .... *A01K 89/0184* (2015.05); *A01K 89/01902* (2015.05); *A01K 89/0192* (2015.05); *A01K 89/01931* (2015.05); *A01K 89/027* (2013.01); *A01K 89/033* (2013.01)

(58) Field of Classification Search
CPC ........ A01K 89/01904; A01K 89/01905; A01K 89/01908; A01K 89/0193; A01K 89/05; A01K 89/058; A01K 89/059; A01K 89/033
See application file for complete search history.

(56) References Cited

U.S. PATENT DOCUMENTS

| | | | |
|---|---|---|---|
| 4,927,095 A * | 5/1990 | Young | A01K 89/01901 242/255 |
| 5,035,374 A | 7/1991 | Kaneko | |
| 5,297,756 A | 3/1994 | Ikuta | |
| 5,318,246 A | 6/1994 | Ikuta | |
| 5,560,562 A * | 10/1996 | Hartmann | A01K 89/01909 242/255 |
| 6,102,316 A | 8/2000 | Nilsen | |
| 6,402,073 B1 | 6/2002 | Datcuk | |
| 6,446,894 B1 * | 9/2002 | Holma | A01K 89/015 242/255 |
| 7,429,011 B1 | 9/2008 | Chang | |
| 9,307,749 B1 | 4/2016 | Alajajyan | |
| 9,992,984 B2 | 6/2018 | Uribe et al. | |
| 10,578,195 B2 | 3/2020 | Steinberger et al. | |
| 2006/0138267 A1 | 6/2006 | Ikuta et al. | |
| 2010/0059615 A1 | 3/2010 | Lombardo et al. | |
| 2011/0011966 A1 | 1/2011 | Takechi et al. | |
| 2012/0018562 A1* | 1/2012 | Takamatsu | A01K 89/015 242/307 |
| 2014/0339350 A1 | 11/2014 | Uribe et al. | |
| 2015/0305315 A1* | 10/2015 | Iwai | A01K 89/033 242/303 |
| 2022/0079130 A1 | 3/2022 | Pulkrabek | |

FOREIGN PATENT DOCUMENTS

| | | |
|---|---|---|
| JP | 2020-178569 A | 11/2020 |
| WO | WO-2014/068202 A1 | 5/2014 |

OTHER PUBLICATIONS

International Search Report and Written Opinion in PCT/US2021/050121 dated Dec. 22, 2021.
International Search Report and Written Opinion in PCT/US2021/050123 dated Dec. 29, 2021.
International Search Report and Written Opinion in PCT/US2021/050124 dated Dec. 22, 2021.

* cited by examiner

FISHING REEL WITH CONCENTRIC DRIVELINE

CROSS-REFERENCE TO RELATED PATENT APPLICATIONS

This application claims the benefit of and priority to U.S. Provisional Application No. 63/078,108, filed Sep. 14, 2020, U.S. Provisional Application No. 63/078,103, filed Sep. 14, 2020, U.S. Provisional Application No. 63/078,114, filed Sep. 14, 2020, and U.S. Provisional Application No. 63/144,513, filed Feb. 2, 2021, all of which are incorporated herein by reference in their entireties.

BACKGROUND

The present disclosure relates generally to fishing reels. More particularly, the present disclosure relates to adjustable drag fishing reels.

SUMMARY

One embodiment of the present disclosure is a fishing rod assembly that includes a rod and a reel assembly. The reel assembly includes a housing, a spool positioned within the housing, the spool configured to rotate about an axis to retrieve or let out a fishing line, a drive mechanism concentric with the axis, the drive mechanism configured to receive rotational kinetic energy from a user and drive the spool to take-up fishing line when a counter-torque provided to the spool by the fishing line is less than a target torque, and a drag mechanism. The drag mechanism is configured to be driven by the drive mechanism and at least one of (a) drive the spool to take-up the fishing line when the counter-torque provided to the spool by the fishing line is less than the target torque or (b) provide a drag force to the spool when the counter-torque provided to the spool by the fishing line is less than the target torque.

Another embodiment of the present disclosure is a fishing reel. The fishing reel includes a housing, a spool, and a drive mechanism. The spool is positioned within the housing and is configured to rotate about an axis to retrieve a fishing line. The drive mechanism is concentric with the axis and is configured to receive rotational kinetic energy from a user and drive the spool to take-up fishing line when a counter-torque provided to the spool by the fishing line is less than a maximum torque. The drag mechanism is configured to be driven by the drive mechanism and at least one of drive the spool to take-up the fishing line when the counter-torque provided to the spool by the fishing line is less than the maximum torque or provide a drag force to the spool when the counter-torque provided to the spool by the fishing line is less than the maximum torque.

Another embodiment of the present disclosure is a driveline for a spool of a fishing reel, The driveline includes a drive mechanism, and a drag mechanism. The drive mechanism is concentric with the axis and is configured to receive rotational kinetic energy from a user and drive a spool through a frictional engagement between a drag plate and a brake pad to take-up fishing line when a counter-torque provided to the spool by the fishing line is less than a maximum torque. The drag mechanism is configured to be driven by the drive mechanism and at least one of drive the spool to take-up the fishing line when the counter-torque provided to the spool by the fishing line is less than the maximum torque or provide a drag force to the spool when the counter-torque provided to the spool by the fishing line is less than the maximum torque.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the Figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

According to an exemplary embodiment, a fishing rod assembly includes a reel. The reel is configured to retrieve or take-up a fishing line. The reel may have a baitcaster configuration, including a spool that rotates about an axis that is substantially perpendicular to an axis along which a rod of the fishing rod assembly extends. The reel includes an input handle through which a fisherman may provide an input torque. In one embodiment, the input handle drives a planetary gear set through an offset gear. In some embodiments, the user can select which of multiple offset gears should engage the planetary gear set to transmit power thereto from the input handle. In this way, a gear ratio across the planetary gear set may be adjustable. In other embodiments, the planetary gear set is a variator that is adjustable by the user (e.g., a fisherman).

In some embodiments, the reel includes an adjustable drag mechanism. The adjustable drag mechanism may include a drag plate that is driven by the planetary gear set and a brake pad that is fixedly coupled with the spool and frictionally engages the drag plate. In other embodiments, the brake pad is not fixedly coupled to the spool. A spindle or elongated member extends centrally through the spool and engages the spool at a distal end of the spool according to one embodiment. The spindle may be translated (e.g., through an adjuster, an adjustment mechanism, a cam mechanism, etc.) so that a compressive force is applied to the brake pad. Increasing the compressive force results in a higher drag exerted on the spool when a counter-torque is applied to the spool (e.g., while fighting a fish). If the counter-torque does not exceed a particular value, the frictional interface or engagement between the brake pad and the drag plate may drive the spool to retrieve fishing line.

Fishing Reel

Figure 1:
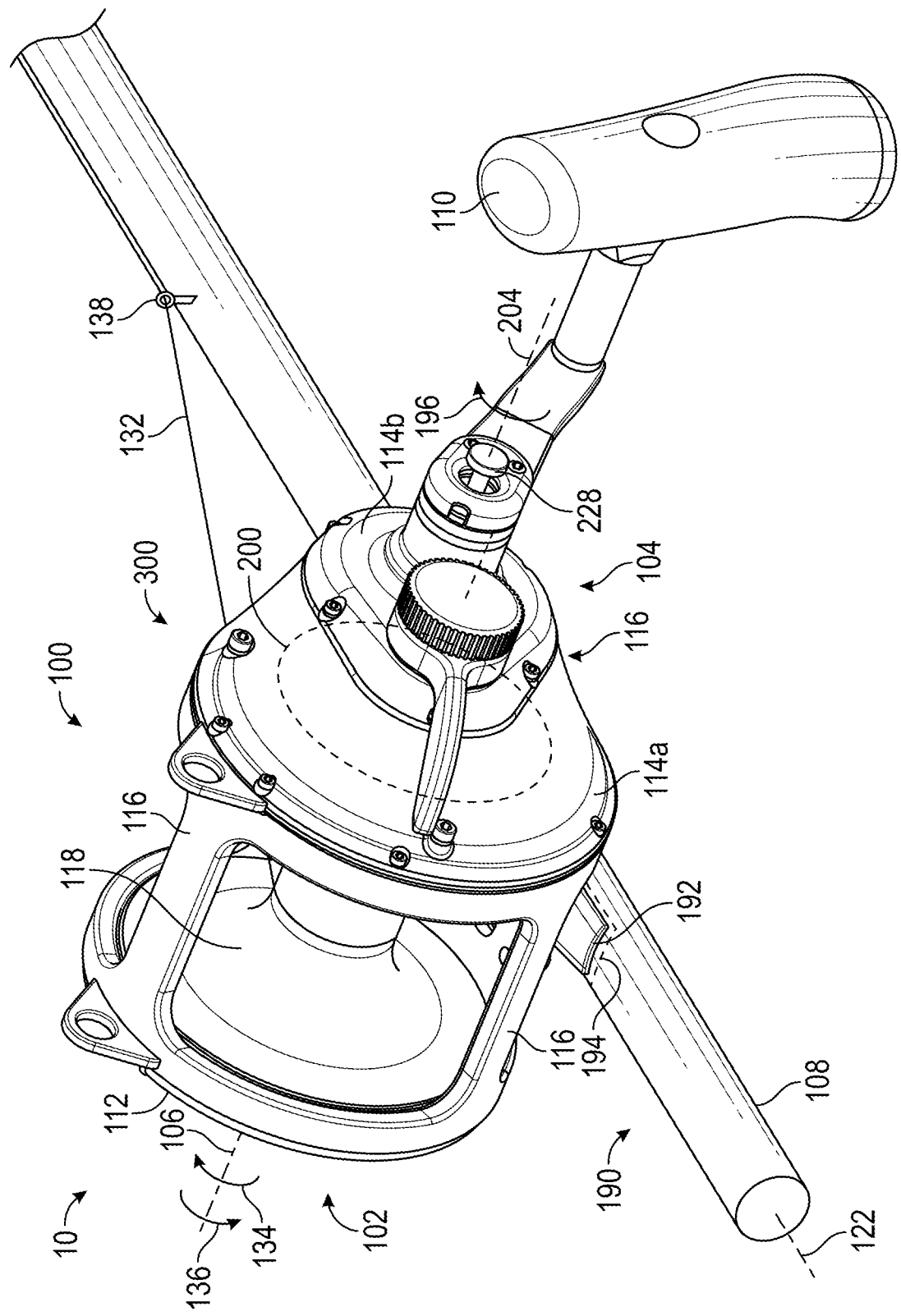
FIG. 1 is a perspective view of a fishing reel, according to an exemplary embodiment.

As shown in the exemplary embodiment of FIG. 1, a fishing rod assembly 10 (e.g., a line retrieval device, a baitcaster, a fishing apparatus, a fishing assembly, etc.) includes a reeling apparatus, a winding apparatus, a fishing line retrieval apparatus, etc., shown as reel 100 and a rod, a pole, a stick, an elongated member, etc., shown as rod 108. Reel 100 is configured to transition between a let-out state or configuration and a take-up state or configuration. In the take-up state, reel 100 is configured to draw, reel, wind, etc., fishing line 132. In the let-out state, reel 100 is configured to allow or facilitate the unwinding or unreeling of fishing line 132 such that fishing line 132 can be let out. Fishing rod assembly 10 is configured to be held in a fisherman's hand (e.g., a left hand or a right hand) and operated (e.g., reeled) with the fisherman's other hand (e.g., the right hand or left hand). For example, fishing rod assembly 10 is shown configured as a right-handed fishing rod, however, fishing rod assembly 10 may alternatively be configured as a left-handed fishing rod.

Rod 108 can be constructed of an organic material (e.g., bamboo), a metal (e.g., aluminum, steel, etc.), a composite, a graphite, a plastic, etc., or any other flexible material that also provides sufficient structural strength for fighting fish. Rod 108 can include multiple sections (e.g., a butt, a blank, a first and second section, a first second and third section, etc.) that are connected to each other. In some embodiments, subsequent sections of rod 108 are inserted into and fixedly coupled with prior sections of rod 108. Rod 108 can include one or more guides, eyelets, hooks, etc., shown as eyelet 138 at least partially along its entire length. The one or more guides may receive fishing line 132 therethrough and guide fishing line 132 from an outer end of rod 108 to reel 100.

Fishing rod assembly 10 also includes a user interface portion, a handle, a hand portion, etc., shown as handle 190. Handle 190 can be formed onto rod 108 at a position that is at least partially rearward of reel 100. Handle 190 can be molded or have a shape that corresponds to a fisherman's left or right hand to facilitate an ergonomic grip of fishing rod assembly 10. In some embodiments, handle 190 is a section that attaches to rod 108 at a position that is rearward of reel 100.

Rod 108 includes a receiving portion, a cleat, a seat, a recess, an interlocking portion, an interfacing portion, etc., shown as reel seat 194. Reel seat 194 is configured to receive and interlock with or fixedly couple with a corresponding portion or engagement member of reel 100, shown as reel foot 192. Reel foot 192 can be inserted at least partially into reel seat 194 and fixedly coupled (e.g., through fasteners, interlocking portions, etc.) with rod 108.

As shown in FIG. 1, reel 100 includes a body portion, a main portion, a housing, etc., shown as first body portion 112, and second body portion 114. Second body portion 114 includes housing member 114a and housing member 114b that cooperatively form second body portion 114. In some embodiments, first body portion 112 and second body portion 114 are positioned on opposite sides of reel 100. First body portion 112 is positioned at a first end 102 of reel 100, while second body portion 114 is positioned at a second end 104 that is opposite first end 102. In some embodiments, second end 104 is a handle side or a handle end.

Reel 100 includes a handle or a driver 110 and a spool, bail, or take-up member, shown as spool 118. Handle 110 rotates about an axis 204 (e.g., a lateral axis) as a fisherman (e.g., by the fisherman's right hand) rotates handle 110 to reel or draw in fishing line 132. When handle 110 is driven to rotate about axis 204 by the fisherman and reel 100 is in the take-up configuration/state, spool 118 rotates in direction 136 about axis 106.

Handle 110 is drivable in direction 196 about an axis 204 to wind or reel fishing line 132 onto spool 118. In some embodiments, axis 204 is parallel with axis 106, but is offset (e.g., in a radial direction, etc.). As handle 22 is driven to rotate about axis 204, a shaft may also be driven to rotate about axis 204 in direction 196. The shaft can input mechanical energy (e.g., rotational kinetic energy, rotation, etc.) to a gear train, a gear box, a gearing system, etc., shown as gear set 200 of reel 100. As handle 110 is rotated in direction 196 about longitudinal axis 204, torque is transferred through the shaft to gear set 200 which is transferred to rotate spool 118 about longitudinal axis 106 in direction 136 to wind or reel or retract fishing line 132.

Referring still to FIG. 1, rod 108 defines and extends along an axis 122 (e.g., centrally through rod 108). In some embodiments, axis 122 is substantially perpendicular with axis 106. Fishing line 132 may extend along rod 108 in a direction along axis 122 throughout, but be taken up or wound onto spool 118 which rotates about axis 106 (e.g., a direction perpendicular with axis 122).

As shown in FIG. 1, reel 100 includes one or more supports 116 that extend between the first body portion 112 and the second body portion 114. Support members 116 can be integrally formed with the first body portion 112 and/or the second body portion 114 and may form a housing structure. Spool 118 is positioned between first body portion 112 and second body portion 114, with supports 116 extending between first body portion 112 and second body portion 114, at radial positions that are beyond an outer radial surface of spool 118.

Spool 118 can be configured to rotate in direction 136 about axis 106 when taking up fishing line 132, and rotate in direction 134 about axis 106 when letting out fishing line 132. In some embodiments, spool 118 is driven to rotate in direction 136 about axis 106 by rotation of handle 110 about axis 204 when fishing rod assembly 10 is in the take-up position or configuration. In some embodiments, spool 118 rotates in direction 134 to let-out fishing line, when fishing rod assembly 10 is in a let out position or configuration, or when a force above a threshold level is applied at an end of fishing line 132.

Planetary Gear Set

Figure 2:
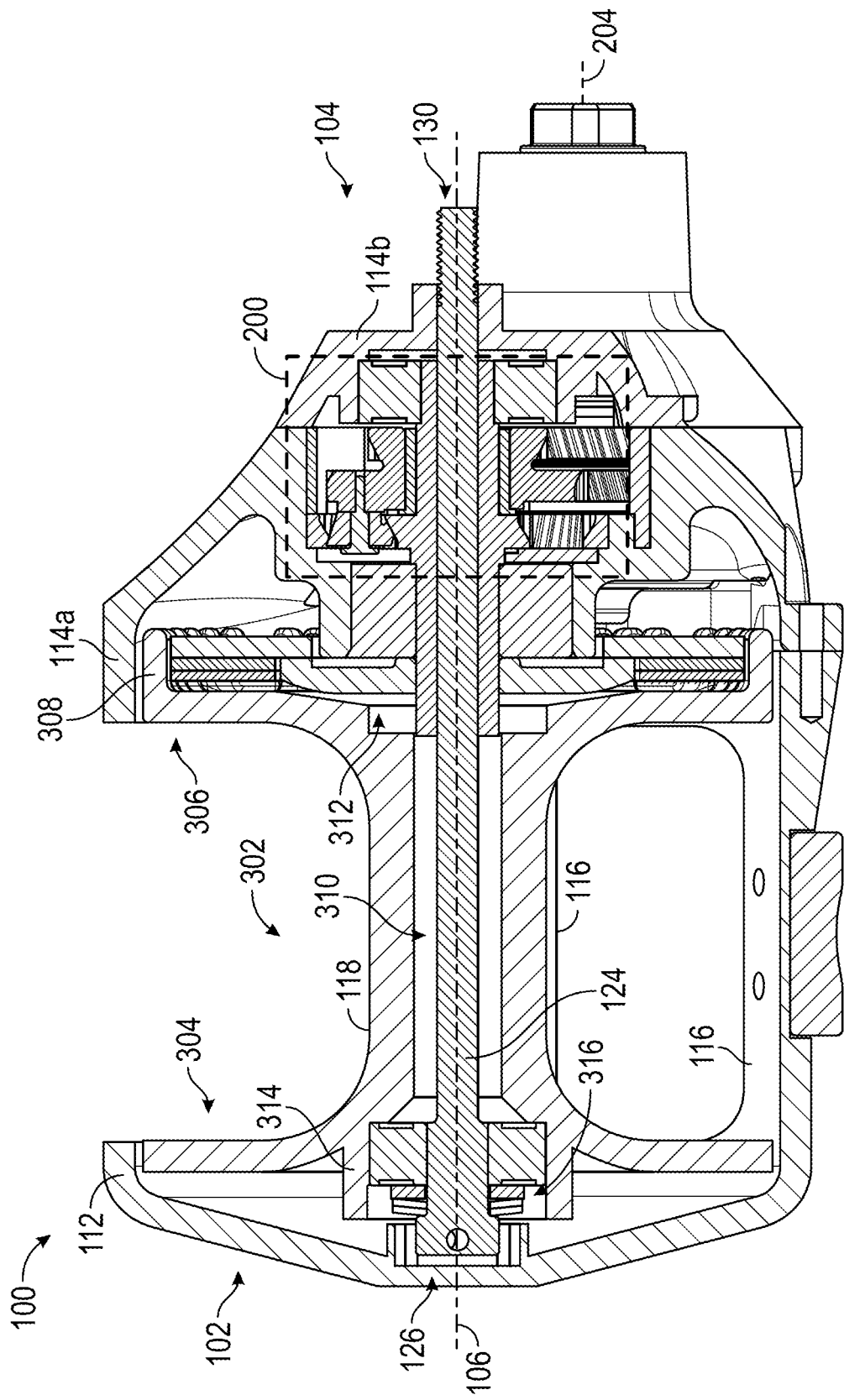
FIG. 2 is a sectional view of the fishing reel of FIG. 1 including a gear set, according to an exemplary embodiment.
Figure 3:
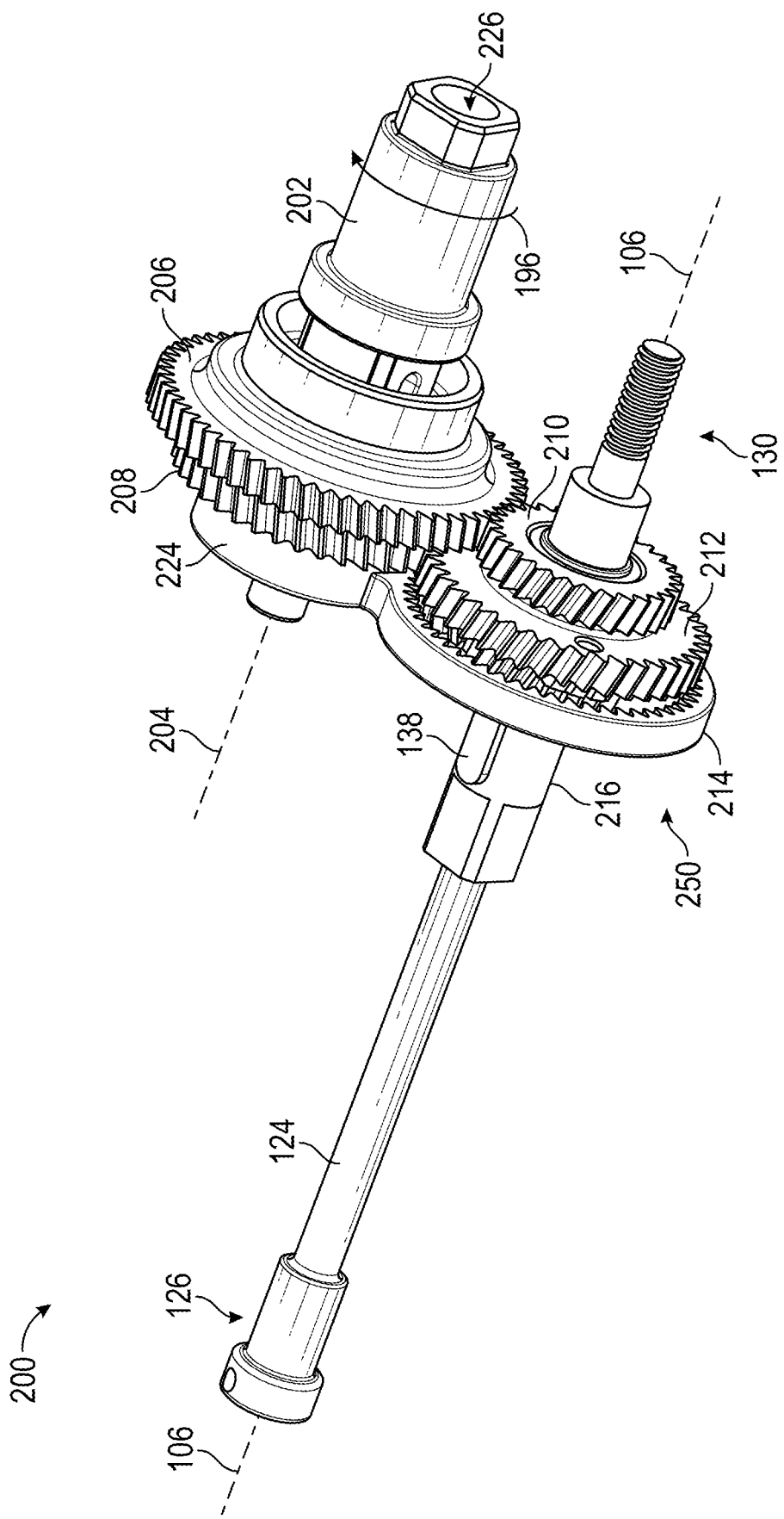
FIG. 3 is a perspective view of the gear set of FIG. 2, according to an exemplary embodiment.
Figure 4:
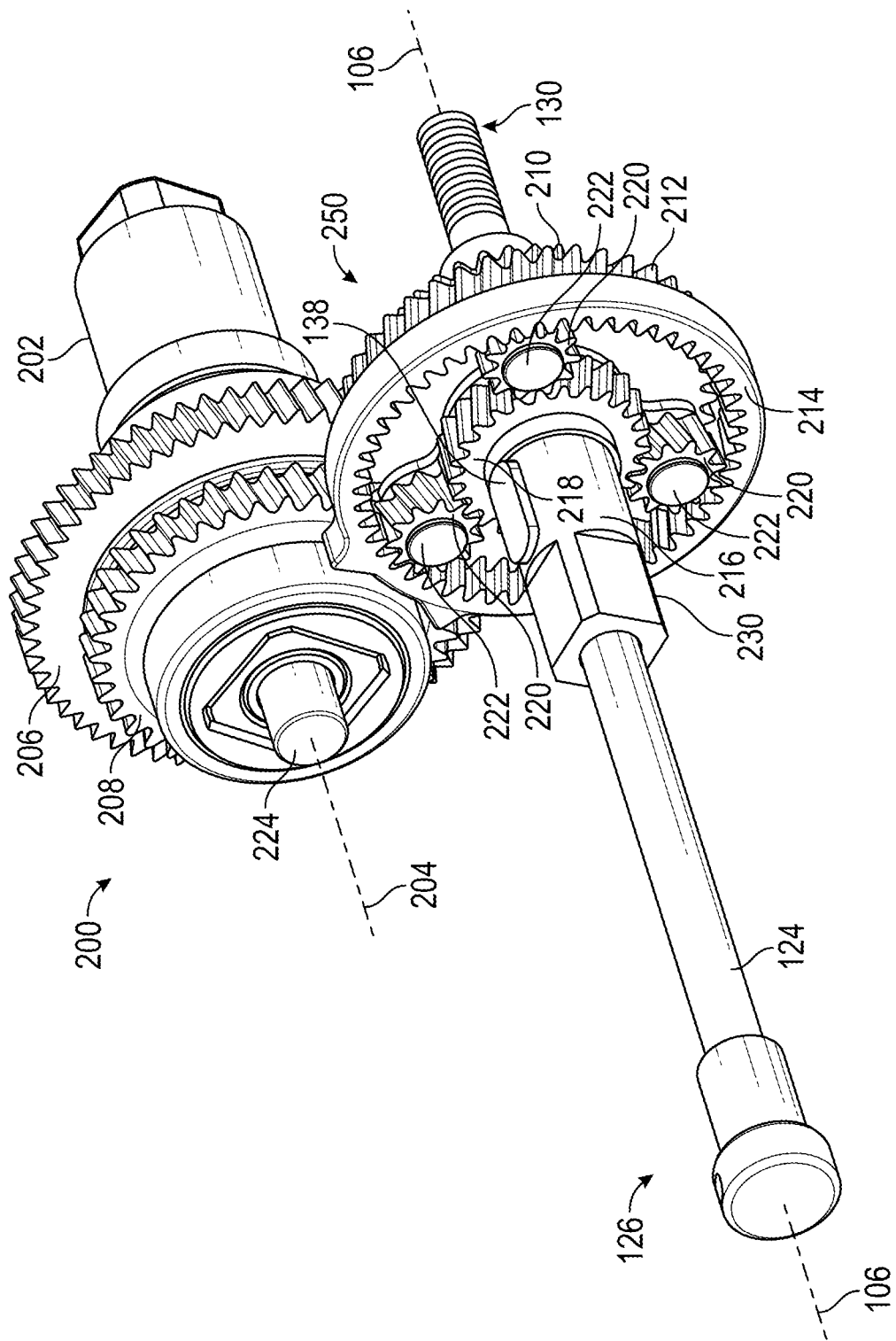
FIG. 4 is another perspective view of the gear set of FIG. 2, according to an exemplary embodiment.

As shown in the exemplary embodiments of FIGS. 2-4, gear set 200 is positioned within an inner volume formed by housing member 114a and housing member 114b. Gear set 200 is configured to receive input torque or mechanical energy (e.g., rotational kinetic energy) from a user through handle 110. The input mechanical energy may be provided to handle 110 and rotate handle 110 about axis 204 (e.g., shown in FIG. 2). The input mechanical energy is transferred through gear set 200 to spool 118. In some embodiments, gear set 200 is configured to receive rotational kinetic energy at an input speed $\omega_{input}$ (e.g., about axis 204) and output rotational kinetic energy (e.g., to spool 118) at an output speed $\omega_{output}$ where $\omega_{output} > \omega_{input}$.

In one embodiment, gear set 200 includes a planetary gear set 250, a shaft 202, a first offset gear 206 (e.g., a first sub-gear), a second offset gear 208 (e.g., a second sub-gear), and a shaft 224. In some embodiments, the first offset gear 206 and the second offset gear 208 are a pair of input gears. It should be understood that while only two input gears (e.g., first offset gear 206 and second offset gear 208) are shown, any number of input gears may be used. In some embodiments, a portion of gear set 200 (e.g., planetary gear set 250) is co-axial with axis 106 and co-cylindrical with a shaft, a spindle, a drive member, etc., shown as spindle 124 of reel 100. Spool 118 is also co-cylindrical with spindle 124. In some embodiments, spindle 124 is configured to provide structural support for gear set 200. Spindle 124 is not driven by gear set 200, but provides support for the various components of gear set 200. Spindle 124 extends between first body portion 112 and second body portion 114 and may define axis 106.

According to the exemplary embodiments of FIGS. 3-4, shaft 202 is centered about axis 204 and is configured to rotate about axis 204. Handle 110 can be fixedly coupled, fastened, secured, attached, etc., with shaft 202. In this way, a user inputs rotational kinetic energy or torque to shaft 202 with handle 110, by rotating handle 110 about axis 204 (e.g., in direction 196).

Shaft 202 may be fixedly coupled with shaft 224. In some embodiments, shaft 202 is rotatably coupled with shaft 224. For example, shaft 202 may be free to rotate or translate relative to shaft 224 (e.g., free to rotate relative to shaft 224 in either direction, or free to translate relative to shaft 224 in either direction).

According to the exemplary embodiment shown in FIGS. 3-4, planetary gear set 250 includes a first carrier gear 210 and a second carrier gear 212 (e.g., output gears). First carrier gear 210 and second carrier gear 212 can be fixedly coupled or integrally formed with each other. First carrier gear 210 and second carrier gear 212 are co-axial with each other, and are both centered about axis 106. First carrier gear 210 is configured to engage or mesh with first offset gear 206, while second carrier gear 212 is configured to engage or mesh with second offset gear 208.

Planetary gear set 250 includes a sun gear 218, a ring gear 214, and multiple planetary gears 220. In some embodiments, gear set 200 includes three planetary gears 220. In other embodiments, gear set 200 includes more or fewer than three planetary gears 220. Each planetary gear 220 is rotatably coupled with a corresponding shaft 222 that is rotatably coupled with the first carrier gear 210 and the second carrier gear 212. Planetary gears 220 are configured to rotate relative to their corresponding shafts 222, but shafts 222 are configured to maintain a particular relative circumferential position between planetary gears 220. Sun gear 218 is fixedly coupled with a shaft collar 216. Shaft collar 216 may extend along spindle 124 as shown in FIGS. 2-4. In some embodiments, shaft collar 216 extends along spindle 124 in a direction towards a first end 130 of spindle 124 and along spindle 124 in a direction towards a second end 126 of spindle 124. Shaft collar 216 may extend along spindle 124 past first carrier gear 210 and second carrier gear 212. In some embodiments, shaft collar 216 is positioned within a bore defined by first carrier gear 210 and second carrier gear 212. A radially-outwards-facing surface of shaft collar 216 is slidably coupled with a radially inwards facing surface of first carrier gear 210 and second carrier gear 212, according to some embodiments. In other embodiments, a radial gap is formed between the radially outwards facing surface of shaft collar 216 and the radially inwards facing surface of first carrier gear 210 and second carrier gear 212. In some embodiments, a bearing (e.g., a slidable bearing, a ball bearing, etc.) is positioned between shaft collar 216 and first carrier gear 210 and second carrier gear 212. In some embodiments, gear set 200 facilitates relative rotation between shaft collar 216 and first carrier gear 210 and second carrier gear 212.

Shaft collar 216 may be rotatably fixedly coupled with sun gear 218 so that a resulting output speed and torque of sun gear 218 is transferred to shaft collar 216. In some embodiments, ring gear 214 is fixedly coupled, attached, secured, etc., with an adjacent housing (e.g., a corresponding portion of second body portion 114) such that rotation thereat is restricted or eliminated.

According to the exemplary embodiment shown in FIGS. 3-4, first offset gear 206 includes teeth that are configured to engage, mesh with, etc., corresponding teeth of first carrier gear 210. Similarly, second offset gear 208 includes teeth that are configured to engage, mesh with, etc., corresponding teeth of second carrier gear 212. In some embodiments, first offset gear 206 and first carrier gear 210 are spur gears that are configured to mesh with each other. In other embodiments, first offset gear 206 and first carrier gear 210 are helical gears that are configured to mesh with each other. Similarly, second offset gear 208 and second carrier gear 212 can be spur gears, or helical gears that are configured to engage or mesh with each other. In other embodiments, first offset gear 206, second offset gear 208, first carrier gear 210, and second carrier gear 212 are sheaves, cogs, etc., coupled with each other (e.g., with a belt).

In some embodiments, gear set 200 is configured to receive an input torque or an input rotational kinetic energy from only one of the first offset gear 206 or the second offset gear 208. In some embodiments, the first offset gear 206 and the second offset gear 208 have a different number of teeth. For example, the first offset gear 206 may have a number of teeth $N_{offset,1}$ that is greater than a number of teeth $N_{offset,2}$ of the second offset gear 208. Both the first offset gear 206 and the second offset gear 208 are configured to rotate about axis 204 that is offset from axis 106 which extends centrally through the sun gear 218 of gear set 200.

First offset gear 206 or second offset gear 208 are configured to provide input torque or rotational kinetic energy to an input one of first carrier gear 210, second carrier gear 212, ring gear 214, sun gear 218, etc. In the embodiment shown in FIGS. 2-4, the first carrier gear 210 or the second carrier gear 212 are the inputs. However, in other embodiments, different gears are inputs gears, and different gears are output gears as discussed in greater detail below.

First offset gear 206 and second offset gear 208 can be selectably rotatably fixedly coupled with shaft 202. In some embodiments, gear set 200 is transitionable between a first position or mode and a second position or mode. When gear set 200 is in the first position or mode, first offset gear 206 is fixedly coupled with shaft 202 while second offset gear 208 is rotatably free relative to shaft 202 so that first offset gear 206 provides the torque or rotational kinetic energy input. When gear set 200 is in the second position or mode, second offset gear 208 is fixedly coupled with shaft 202 while first offset gear 206 is rotatably free relative to shaft 202 so that second offset gear 208 provides the torque or rotational kinetic energy input.

Similar to first offset gear 206 and second offset gear 208, first carrier gear 210 and second carrier gear 212 can have a different number of teeth. For example, first carrier gear 210 may have a number of teeth $N_{carrier,1}$ that is less than a number of teeth $N_{carrier,2}$ of second carrier gear 212.

In some embodiments, shaft 202 is configured to selectably engage (e.g., selectably fixedly couple) with one of the first offset gear 206 or second offset gear 208 through a user input. The user input can be provided by an shaft 202 to translate, adjust, etc., an internal mechanism of shaft 202 so that shaft 202 engages (e.g., rotatably fixedly couples with) one of first offset gear 206 or second offset gear 208. For example, shaft 202 may include an inner volume, a bore, a hole, a blind hole, a through hole, etc., shown as bore 226 that extends into shaft 202. An elongated member, a rod, a button, a knob, a button, a lever, etc., shown as adjustment member 228 (see FIG. 1) may be configured to change or adjust a gear ratio across the input gears (e.g., first offset gear 206 and second offset gear 208) and the output gears (e.g., first carrier gear 210 and second carrier gear 212). In some embodiments, adjustment member 228 is configured to extend through shaft 202 or is configured to couple with, drive, or interface with a rod that extends through shaft 202. Adjustment member 228 can be a rotatable member that rotates relative to shaft 202, or a translatable member that translates relative to shaft 202 along bore 226, among other alternatives. Rotation or translation of adjustment member 228 (e.g., by a user) may activate a locking mechanism (e.g., a key mechanism, a spline mechanism, etc.) that rotatably fixedly couples one of the first offset gear 206 and the second offset gear 208 with shaft 202, while disengaging the other of first offset gear 206 and second offset gear 208.

In some embodiments, a gear ratio $$\frac{N_{offset,1}}{N_{carrier,1}}$$

between the first offset gear 206 and the first carrier gear 210 is different than a gear ratio $$\frac{N_{offset,2}}{N_{carrier,2}}$$

between the second offset gear 208 and the second carrier gear 212. An overall gear ratio of gear set 200 (e.g., between the input handle 110 and the spool 118) is thereby user adjustable. For example, if a gear ratio of planetary gear set 250 is 5:1, and there is an input ratio of 2:1 between the engaged first offset gear 206 and the input gear of planetary gear set 250 (e.g., first carrier gear 210), then an overall gear ratio of gear set 200 is 10:1. Similarly, if the gear ratio of planetary gear set 250 is 5:1, and there is an input ratio of 1:1 between the engaged second offset gear 208 and the second offset gear 208, then an overall gear ratio of gear set 200 is 5:1. It should be understood that while planetary gear set 250 is illustrated as having the first carrier gear 210 or the second carrier gear 212 as the input gear of planetary gear set 250, the input gear of planetary gear set 250 may be ring gear 214 (e.g., with the carrier of planetary gear set fixed) such that an output gear of planetary gear set 250 is sun gear 218. In another embodiment, the input gear of planetary gear set 250 is sun gear 218 (e.g., with the carrier of planetary gear set fixed) such that the output gear of planetary gear set 250 is ring gear 214. In another embodiment, the input gear of planetary gear set 250 is sun gear 218 (e.g., with the ring gear 214 of planetary gear set 250 fixed) such that the output gear of planetary gear set 250 is the carrier (e.g., the first carrier gear 210 and/or the second carrier gear 212).

Regardless of which gears of planetary gear set 250 are input gears, and which gears or elements are output gears, first offset gear 206 and second offset gear 208 provide an adjustable overall gear ratio of gear set 200. As described in the example above, the user may adjust the overall gear ratio of gear set 200 between 10:1 and 5:1 by selectably engaging first offset gear 206 or second offset gear 208 (e.g., by actuating, rotating, or otherwise operating adjustment member 228).

Gear Set with Variators

Figure 14:
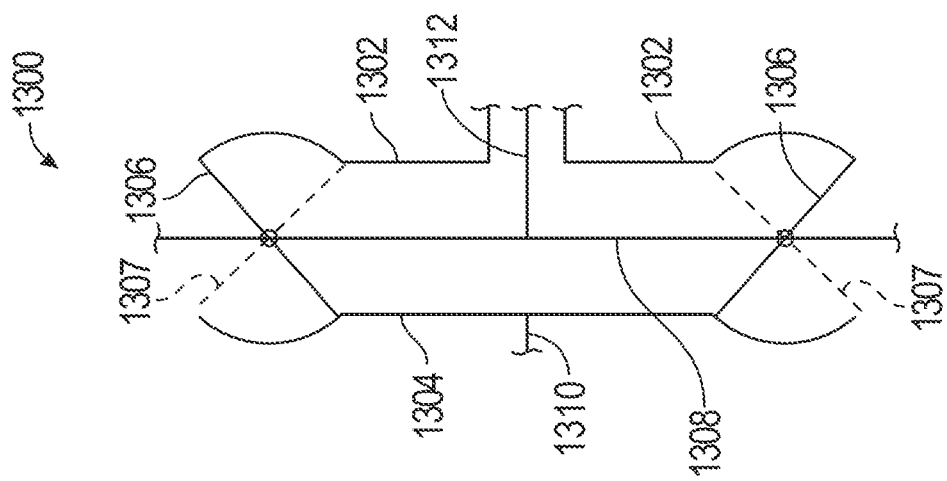
FIG. 14 is a schematic diagram of the gear set of FIG. 1 as a variator gear set, according to another exemplary embodiment.
Figure 13:
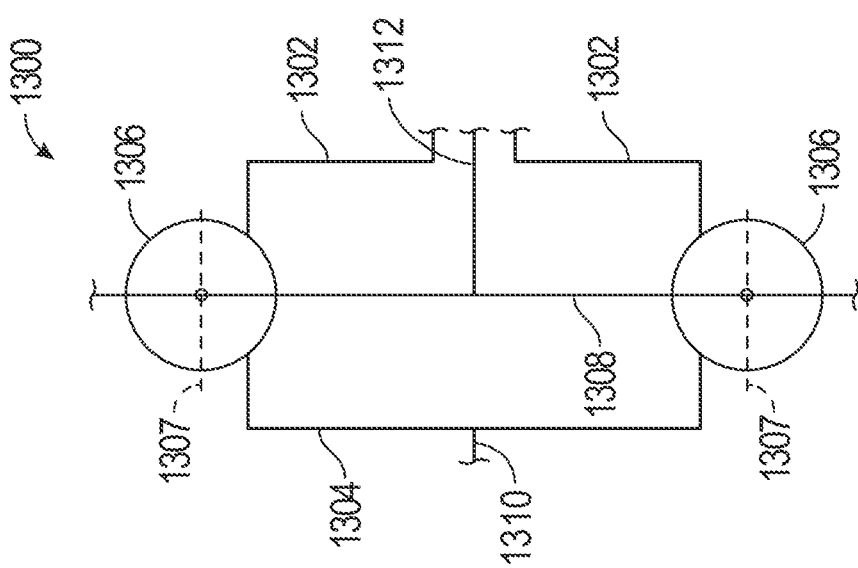
FIG. 13 is a schematic diagram of the gear set of FIG. 1 as a variator gear set, according to an exemplary embodiment.

Referring to the exemplary embodiments shown in FIGS. 13-14, a gear set 1300 may be gear set 200 implemented as a variator gear set. In some embodiments, gear set 1300 is a variable ratio power transmission device or variator configured to vary a ratio (e.g., a torque ratio, a gear ratio, a speed ratio, etc.) between an input to gear set 1300 and an output from gear set 1300. In other embodiments, such ratios are fixed. An input is a rotational mechanical energy input having an input speed and an input torque. An output is a rotational mechanical energy output having an output speed and an output torque. Gear set 1300 may have various arrangements (e.g., an epicyclic or planetary arrangement, a radially offset arrangement, etc.). Gear set 1300 may utilize various types of variator configurations.

In the exemplary embodiment shown in FIGS. 13 and 14, gear set 1300 is an epicyclic device or planetary device that includes a first rotatable portion 1302, a second rotatable portion 1304 that is driven by a connecting shaft 1310, and one or more adjusters or connectors 1306 each configured to rotate about a corresponding axis 1307. The connectors 1306 engage (e.g., rotationally) both first rotatable portion 1302 and second rotatable portion 1304, thereby coupling first rotatable portion 1302 to second rotatable portion 1304, according to an exemplary embodiment. As shown in FIGS. 13 and 14, a carrier 1308 rotationally supports connectors 1306 such that each connecting member 1306 rotates relative to carrier 1308 about the corresponding axis 1307. Carrier 1308 or first rotatable portion 1302 may be driven to rotate by connectors 1306 to drive an output shaft 1312. In some embodiments, connectors 1306 are selectively repositionable such that axes 1307 rotate relative to carrier 1308. As the orientations of connectors 1306 change relative to carrier 1308, connectors 1306 may engage first rotatable portion 1302 and second rotatable portion 1304 at different locations, varying the speed ratios between first rotatable portion 1302, second rotatable portion 1304, and carrier 1308. Each of first rotatable portion 1302, second rotatable portion 1304, and carrier 1308 may receive an input or provide an output depending on the configuration of reel 100.

In the embodiment shown in FIG. 13, gear set 1300 is an epicyclic or planetary device configured as a friction ball variator. In this embodiment, connectors 1306 are balls (e.g., spheres, etc.) that are rotatable relative to carrier 1308 about axes 1307. In the embodiment shown in FIG. 13, gear set 1300 is shown to include two connectors 1306, however, gear set 1300 may include more or fewer connectors 1306 (e.g., 1, 3, 4, 10, etc.). The first rotatable portion 1302 and second rotatable portion 1304 each include an engagement surface that extends along a circular path and is configured to engage connectors 1306 (e.g., through friction, etc.). Accordingly, first rotatable portion 1302 is rotationally engaged with second rotatable portion 1304 through connectors 1306. Each connecting member 1306 is configured to rotate relative to carrier 1308 about an axis 1307 in response to a rotational mechanical energy input (e.g., through first rotatable portion 1302, through second rotatable portion 1304, through carrier 1308, etc.).

In some embodiments, axes 1307 are fixed (e.g., permanently, selectively, etc.) relative to carrier 1308. In other embodiments, to facilitate varying speed ratios between inputs to gear set 1300 and outputs from gear set 1300, each axis 1307 is rotatable relative to carrier 1308 (e.g., such that axis 1307 rotates about an axis extending perpendicular to the plane of FIG. 13). Connectors 1306 may have a curved profile such that rotating the axes 1307 of connectors 1306 varies the ratios between the speed of first rotatable portion 1302, the speed of second rotatable portion 1304, and the speed of carrier 1308. Rotating the axis 1307 corresponding to one of the connectors 1306 in a first direction both (a) reduces the distance between that axis 1307 and the point where first rotatable portion 1302 engages that connecting member 1306 and (b) increases the distance between that axis 1307 and the point where second rotatable portion 1304 engages that connecting member 1306. In one such arrangement, with carrier 1308 held fixed, first rotatable portion 1302 rotates more slowly than second rotatable portion 1304. Rotating the axis 1307 in the opposite direction may have the opposite effect. In some embodiments, the axes 1307 are rotationally coupled such that they rotate in unison.

In the embodiment shown in FIG. 14, gear set 1300 is an epicyclic or planetary device configured as a toroidal variator. In this embodiment, each connecting member 1306 is a wheel or disc that is rotatable relative to carrier 1308. In the embodiment shown in FIG. 14, gear set 1300 includes two connectors 1306, however, gear set 1300 may include more or fewer connectors 1306 (e.g., 1, 3, 4, 10, etc.) according to alternative embodiments. The first rotatable portion 1302 and second rotatable portion 1304 each include a toroidal engagement surface that is configured to engage connectors 1306 (e.g., through friction, etc.). Accordingly, first rotatable portion 1302 is rotationally engaged with second rotatable portion 1304 through connectors 1306. Each connecting member 1306 is configured to rotate relative to carrier 1308 about an axis 1307 in response to a rotational mechanical energy input (e.g., through first rotatable portion 1302, through second rotatable portion 1304, through carrier 1308, etc.).

In some embodiments, axes 1307 are fixed relative to carrier 1308. In other embodiments, to facilitate varying speed ratios between inputs to gear set 1300 and outputs from gear set 1300, each axis 1307 is rotatable relative to carrier 1308 (e.g., such that axis 1307 rotates about an axis extending perpendicular to the plane of FIG. 14). To facilitate continuous engagement between connectors 1306, first rotatable portion 1302, and second rotatable portion 1304 as the axis 1307 rotates, the toroidal engagement surfaces may be concave with a constant radius cross sectional curvature. In such embodiments, rotating the axes 1307 varies the ratios between the speed of first rotatable portion 1302, the speed of second rotatable portion 1304, and the speed of carrier 1308. Rotating the axis 1307 corresponding to one of the connectors 1306 in a first direction both (a) increases the radius between the axis of rotation of first rotatable portion 1302 and the point where that connecting member 1306 engages first rotatable portion 1302 and (b) decreases the radius between the axis of rotation of second rotatable portion 1304 and the point where that connecting member 1306 engages second rotatable portion 1304. In one such arrangement, with carrier 1308 held fixed, first rotatable portion 1302 rotates more slowly than second rotatable portion 1304. Rotating the axis 1307 in the opposite direction has the opposite effect. In some embodiments, the axes 1307 are rotationally coupled such that they rotate in unison.

In some embodiments, the connecting shaft 1310 is an input shaft that is driven by handle 110. For example, handle 110 may be rotatably fixedly coupled with connecting shaft 1310. Similarly, first rotatable portion 1302 may be rotatably fixedly coupled with shaft collar 216 (e.g., which is used to drive spool 118 for take-up).

Translatable Spool and Drag

Figure 5:
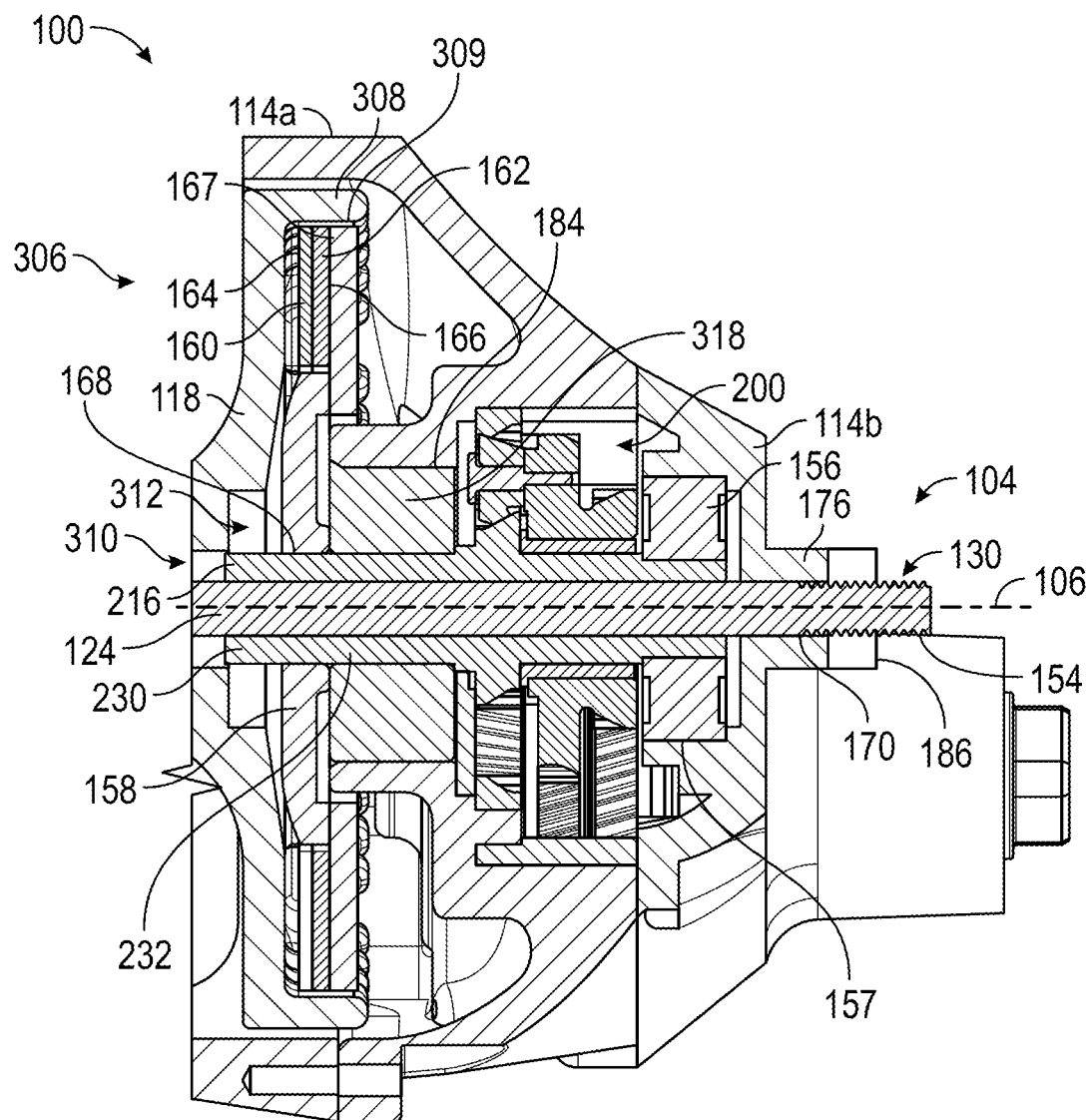
FIG. 5 is a side sectional view of fishing reel of FIG. 1, according to an exemplary embodiment.
Figure 6:
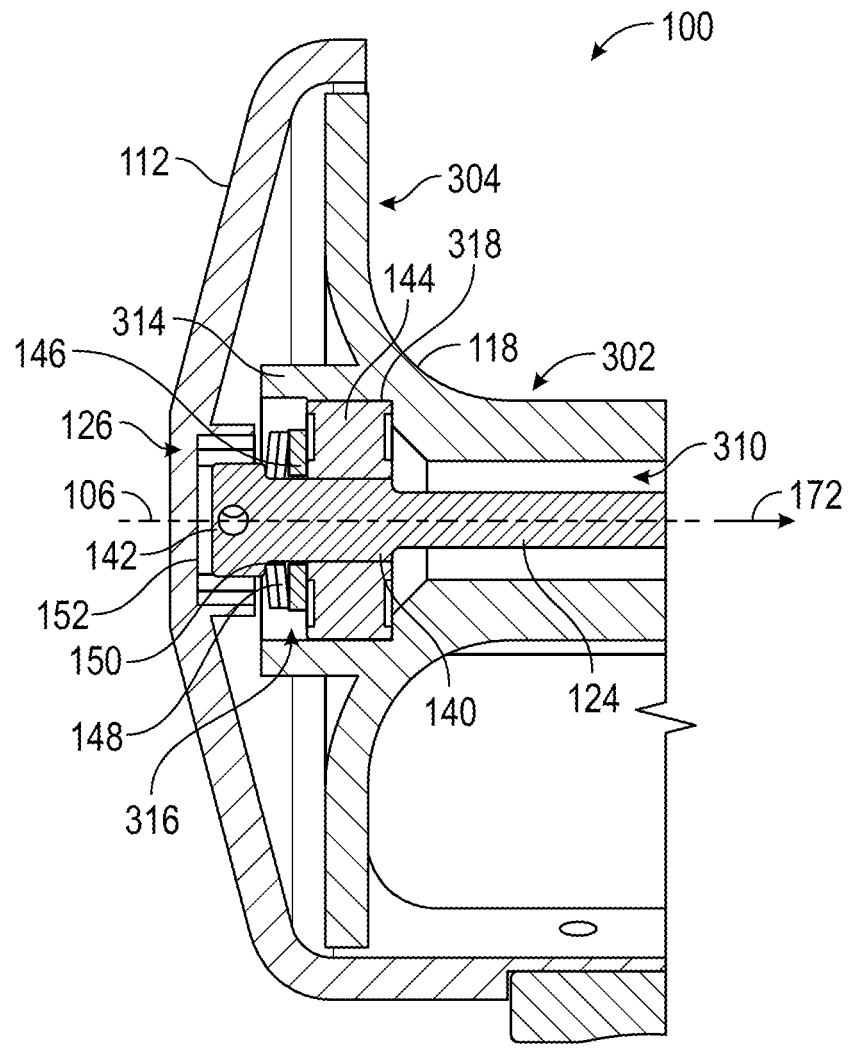
FIG. 6 is a side sectional view of a portion of the fishing reel of FIG. 1, according to an exemplary embodiment.
Figure 7:
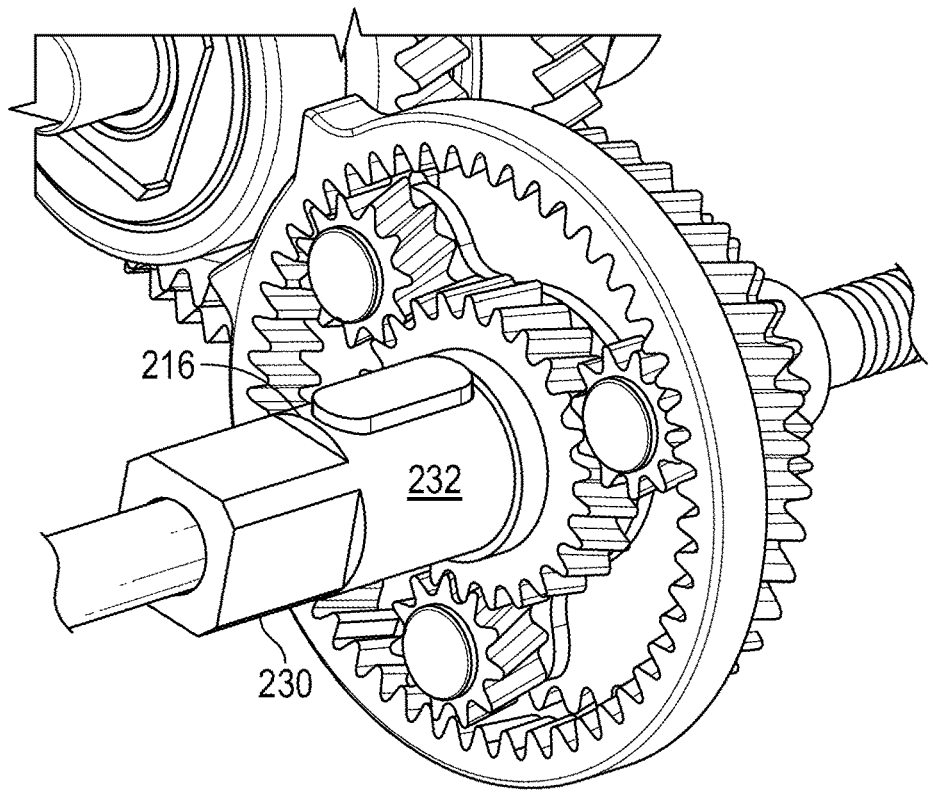
FIG. 7 is a perspective view of a portion of the gear set of FIG. 2, according to an exemplary embodiment.

According to the exemplary embodiment shown in FIGS. 2, 5, and 6, spool 118 includes a central portion 302, a first outer portion 304 and a second outer portion 306. In some embodiments, central portion 302 has a hollow cylindrical shape through which spindle 124 extends. First outer portion 304 and second outer portion 306 are positioned at distal ends of central portion 302 (e.g., at first end 102 and second end 104, respectively). First outer portion 304 and second outer portion 306 may be integrally formed with or fixedly coupled with central portion 302. Central portion 302, first outer portion 304, and second outer portion 306 are all centered along axis 106. First outer portion 304 and second outer portion 306 extend radially outwards from a radially outer surface of central portion 302.

Spool 118 defines an inner volume, an opening, a bore, a through-hole, etc., shown as inner volume 310. Inner volume 310 extends along substantially an entire length of spool 118 (e.g., along axis 106) and receives spindle 124 therethrough. Inner volume 310 has an inner radius or diameter that is greater than an outer radius or diameter of spindle 124. In some embodiments, a gap is formed between a radial outer surface of spindle 124 and a radially inwards facing surface of spool 118. In some embodiments, inner volume 310 has a minimal inner radius or diameter that is substantially equal to or greater than an outer radius or outer diameter of shaft collar 216.

Spool 118 also includes an end portion 314 that is positioned at first end 102 of reel 100. End portion 314 is centered about axis 106 and may have a generally cylindrical shape. End portion 314 may be integrally formed with spool 118 (e.g., with first outer portion 304). In some embodiments, end portion 314 extends along axis 106 beyond an outer periphery of first outer portion 304.

End portion 314 may define an inner volume 316 that is coupled with or a portion of inner volume 310. In some embodiments, inner volume 316 is a bore or a hole that has an inner diameter or inner radius greater than an inner diameter or inner radius of inner volume 310. Spindle 124 can extend through inner volume 310 and inner volume 316. More particularly, a medial portion of spindle 124 extends through inner volume 310, while second end 126 of spindle 124 extends through inner volume 316.

Second end 126 of spindle 124 includes a first portion 140 having a first diameter or radius, and a second portion 142 having a second diameter or radius. In an exemplary embodiment, the diameter or radius of second portion 142 is greater than the diameter or radius of first portion 140. In this way, first portion 140 and second portion 142 define a shoulder 150 (e.g., a step).

Referring particularly to FIG. 6, reel 100 includes a bearing 144 (e.g., a ball-bearing, a roller bearing, a fluid bearing, a magnetic bearing, a plain bearing, etc.) that is configured to support second end 126 of spindle 124. Bearing 144 can be received within (e.g., press fit, slip fit, etc.) end portion 314. Bearing 144 is positioned within inner volume 316 of end portion 314 such that a radially outwards facing surface of bearing 144 (e.g., a radially outwards facing surface of an outer race of bearing 144) engages, contacts, etc., a corresponding radially inwards facing surface of end portion 314. In some embodiments, an outer radius or outer diameter of bearing 144 is substantially equal to an inner radius or inner diameter of end portion 314.

First portion 140 of second end 126 of spindle 124 is received within a central opening, a hole, an inner race, a bore, etc., of bearing 144. First portion 140 can have an outer radius or outer diameter that is substantially equal to an inner radius or inner diameter of the central opening of bearing 144. First portion 140 can be press fit or slip fit with an inner race or a radially inwards facing surface of bearing 144.

Reel 100 also includes a washer 146 and a spring washer 148. Washer 146 can be positioned within inner volume 316 of spool 118 and may abut, directly contact, engage, etc., a corresponding surface of bearing 144 (e.g., an outer surface of bearing 144). Spring washer 148 is positioned between washer 146 and second portion 142 of second end 126 of spindle 124. Spring washer 148 may engage, directly contact, abut, etc., the shoulder 150 defined between first portion 140 and second portion 142. In this way, spring washer 148 may engage shoulder 150 on one side, and washer 146 or bearing 144 on an opposite side. Bearing 144 may be configured to abut, contact, engage, etc., a shoulder of spool 118 that is formed or defined by inner volume 316 of end portion 314. In other embodiments, other resilient members bias spool 118, or spool 118 is otherwise biased.

Second portion 142 of the second end 126 of spindle 124 is received within an opening, a recess, a groove, a depression, an aperture, a blind hole, an inner volume, an interfacing portion, a receiving portion, etc., shown as aperture 152 of first body portion 112. In this way, first body portion 112 can function as both a housing or protective member as well as a structural member. In some embodiments, the second portion 142 of second end 126 of spindle 124 is rotatably fixedly coupled within the aperture 152 so that spindle 124 does not rotate within aperture 152. In some embodiments, second portion 142 of second end 126 of spindle 124 is slidably coupled with one or more interior surfaces defined by aperture 152. In this way, spindle 124 may translate relative to first body portion 112.

According to the exemplary embodiment shown in FIGS. 4 and 5, shaft collar 216 includes an interface 230 and a cylindrical portion 232. Interface 230 may have a generally square cross-sectional shape (as shown in FIG. 4) or one or more planar faces that are angled relative to each other (e.g., at 90 degrees). Interface 230 may have a square cross-sectional shape with chamfered or rounded corners.

Cylindrical portion 232 is integrally formed with interface 230 and may have the form of a shaft. Shaft collar 216 also includes a key 138 (see FIG. 4) that is configured to interface with, be received within, couple with, etc., a one-way bearing 318 (see FIG. 5). One-way bearing 318 mounts, is fixedly coupled with, is received within, etc., a bore 184 (e.g., a hole, a through-hole, a mounting structure, an aperture, etc.) of housing member 114a. An inner race of one-way bearing 318 may have an aperture, a groove, a channel, etc., that is configured to receive the key 138 of shaft collar 216. Key 138 may be fixedly coupled, integrally formed, adhered, secured, fastened, etc., with shaft collar 216.

Referring particularly to FIG. 5, shaft collar 216 is supported at an opposite end (e.g., an end of shaft collar 216 that is proximate the second end 104 of reel 100) through a bearing 156 (e.g., a ball-bearing, a roller bearing, a fluid bearing, a magnetic bearing, a plain bearing, etc.). Bearing 156 may be received within, pressed into, fixedly coupled within, mounted in, etc., a corresponding bore 157 of housing member 114b.

Referring still to FIG. 5, reel 100 includes an interfacing member, a disc member, a drive member, etc., shown as drag plate 158. Drag plate 158 is centered about axis 106 and is configured to rotate about axis 106. Drag plate 158 is rotatably fixedly coupled with shaft collar 216 so that drag plate 158 receives rotational kinetic energy output, mechanical energy output, torque output, etc., of gear set 200. Drag plate 158 extends radially outwards from an exterior surface of shaft collar 216 to approximately a radially inwards facing surface 309 of a tab portion 308 of spool 118. Tab portion 308 may extend in a direction along axis 106 (e.g., toward second end 104 of reel 100) at a radially outer position (e.g., a radially outermost position) of second outer portion 306.

Drag plate 158 can be positioned proximate, adjacent to, or directly next to one-way bearing 318. Drag plate 158 includes a central opening 168 (e.g., a through-hole, a bore, an interfacing hole, etc.) that is configured to facilitate the fixed coupling (e.g., rotationally fixing shaft collar 216 and drag plate 158 together). Drag plate 158 may be coupled with shaft collar 216 at or along interface 230. In some embodiments, central opening 168 has a cross-sectional shape (e.g., an opening or aperture shape) that corresponds to or is configured to interface with a cross-sectional shape of interface 230 of shaft collar 216. For example, central opening 168 may have a square shape which corresponds to the square shape of interface 230 (shown in FIGS. 3-4).

Drag plate 158 may extend in a radial-only direction, or may be stepped as shown in FIG. 5. For example, drag plate 158 may extend radially outwards a first distance, then extend in a direction along axis 106 (e.g., towards second end 104), then extend further radially outwards. In this way, drag plate 158 may be contoured to fit within housing member 114a, and may at least partially overlap one-way bearing 318.

Referring still to FIG. 5, reel 100 includes a friction plate, a brake plate, etc., shown as brake disc 162. Brake disc 162 includes or defines an engagement surface, a frictional surface, an outer surface, etc., shown as engagement surface 166. Reel 100 also includes a backing plate, a brake plate, etc., shown as brake backing plate 160. Brake backing plate 160 is configured to facilitate fixed coupling, attachment, mounting, etc., of brake disc 162 with spool 118. In particular, brake backing plate 160 can be fixedly coupled with a lateral face 164 of spool 118, or more particularly, of second outer portion 306. Brake backing plate 160 is fixedly coupled with lateral face 164 of spool 118 on one side and fixedly couples with brake disc 162 along an opposite lateral side or surface.

An outer portion of drag plate 158 defines an engagement surface, a lateral surface, an engagement face, etc., shown as engagement face 167. Engagement face 167 may contact, directly abut, engage, directly touch, etc., engagement surface 166 of brake disc 162, thereby forming a frictional engagement or a frictional interface between brake disc 162 and drag plate 158. In this way, rotational kinetic energy can be transferred from the gear set 200, though the drag plate 158 and the frictional engagement (between brake disc 162 and drag plate 158) to spool 118 to drive spool 118 to rotate.

A strength or a frictional force of the frictional interface is related to a compressive force that exists between the engagement surface 166 of brake disc 162 and the engagement face 167 of drag plate 158, a surface area that is exposed between the engagement surface 166 of brake disc 162 and the engagement face 167 of drag plate 158, and a static coefficient of friction $\mu_{static}$ of the material of brake disc 162. In some embodiments, the compressive force between the spool 118 and the drag plate 158 is adjustable (e.g., by the fisherman). For example, as discussed in greater detail above, spool 118 may translate along axis 106.

Referring to FIGS. 5 and 6, reel 100 can include an adjustment member 186 (e.g., a nut, a fastener, etc.) that is configured to drive spindle 124 and spool 118 to translate along axis 106. First end 130 of spindle 124 extends through an opening, an aperture, a bore, etc., shown as aperture 170 of housing member 114b. First end 130 of spindle 124 includes threads 154 which may be exposed outside of housing member 114b. Adjustment member 186 is configured to threadingly couple or engage threads 154 and may abut, contact, engage, etc., a corresponding surface of housing member 114b. The fisherman may adjust adjustment member 186 (e.g., rotate adjustment member 186 in a first or second direction about axis 106) to draw spindle 124 in direction 172 along axis 106. Similarly, the fisherman may adjust adjustment member 186 (e.g., rotate adjustment member 186 in an opposite direction) to allow spindle 124 to translate in an opposite direction along axis 106 (e.g., a direction opposite direction 172).

Spindle 124 can translate along axis 106 relative to shaft collar 216. When spindle 124 translates in direction 172, the second end 126 of spindle 124 (e.g., shoulder 150) catches spool 118 (e.g., through spring washer 148, washer 146, and bearing 144) and draws spool 118 in direction 172 relative to shaft collar 216. Translation of spool 118 in direction 172 (shown in FIG. 6) results in brake disc 162 being pressed against, driven into, forced into engagement with, etc., drag plate 158. Specifically, translation of spool 118 in direction 172 increases a compressive force between engagement surface 166 and engagement face 167. Increasing the compressive force therebetween engagement surface 166 and engagement face 167 increases a strength of the frictional engagement therebetween (e.g., increases a maximum frictional torque or a maximum frictional force).

Figure 8:
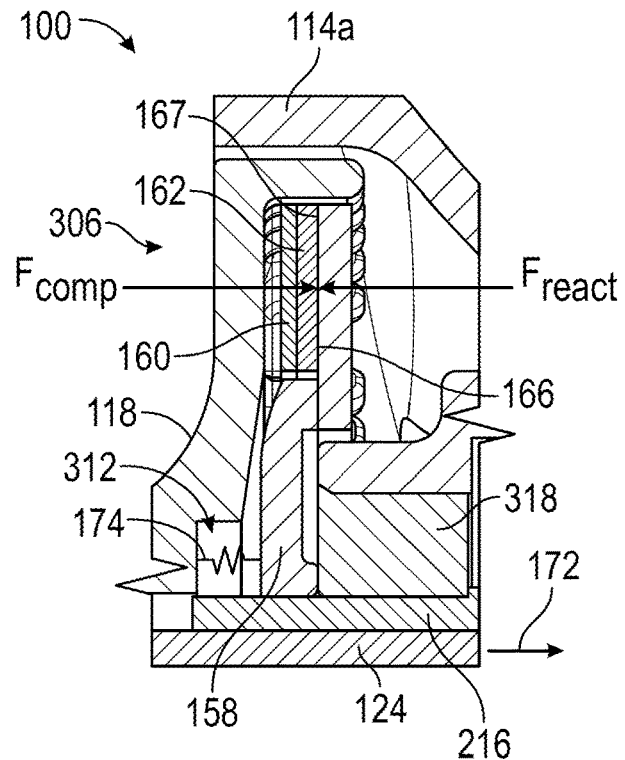
FIG. 8 is a side sectional view of a frictional engagement between a drag plate and a brake pad of the fishing reel, according to an exemplary embodiment.

According to the exemplary embodiment shown in FIG. 8, the compressive force between brake disc 162 and drag plate 158 is shown, according to an exemplary embodiment. As spool 118 is translated in direction 172, a compressive force $F_{comp}$ exerted by brake disc 162 may be increased, thereby resulting in an increased reactionary force $F_{react}$ that is exerted by drag plate 158.

Referring still to FIG. 8, reel 100 may include a spring 174 that is positioned between the spool 118 and the drag plate 158. Spring 174 may be positioned within inner volume 312 that is formed between spool 118 and drag plate 158. Spring 174 functions to provide a reactionary or expansive force when spring 174 is compressed due to translation of spool 118 in direction 172 relative to shaft collar 216 and drag plate 158. Spring 174 can facilitate returning spool 118 back to an original or rest position when spool 118 is not driven to translate along axis 106. For example, when the fisherman adjusts adjustment member 186 to release spindle 124 or to allow spindle 124 to return to the rest position, spring 174 can facilitate driving spool 118 to translate along axis 106 back to the rest position.

Figure 9:
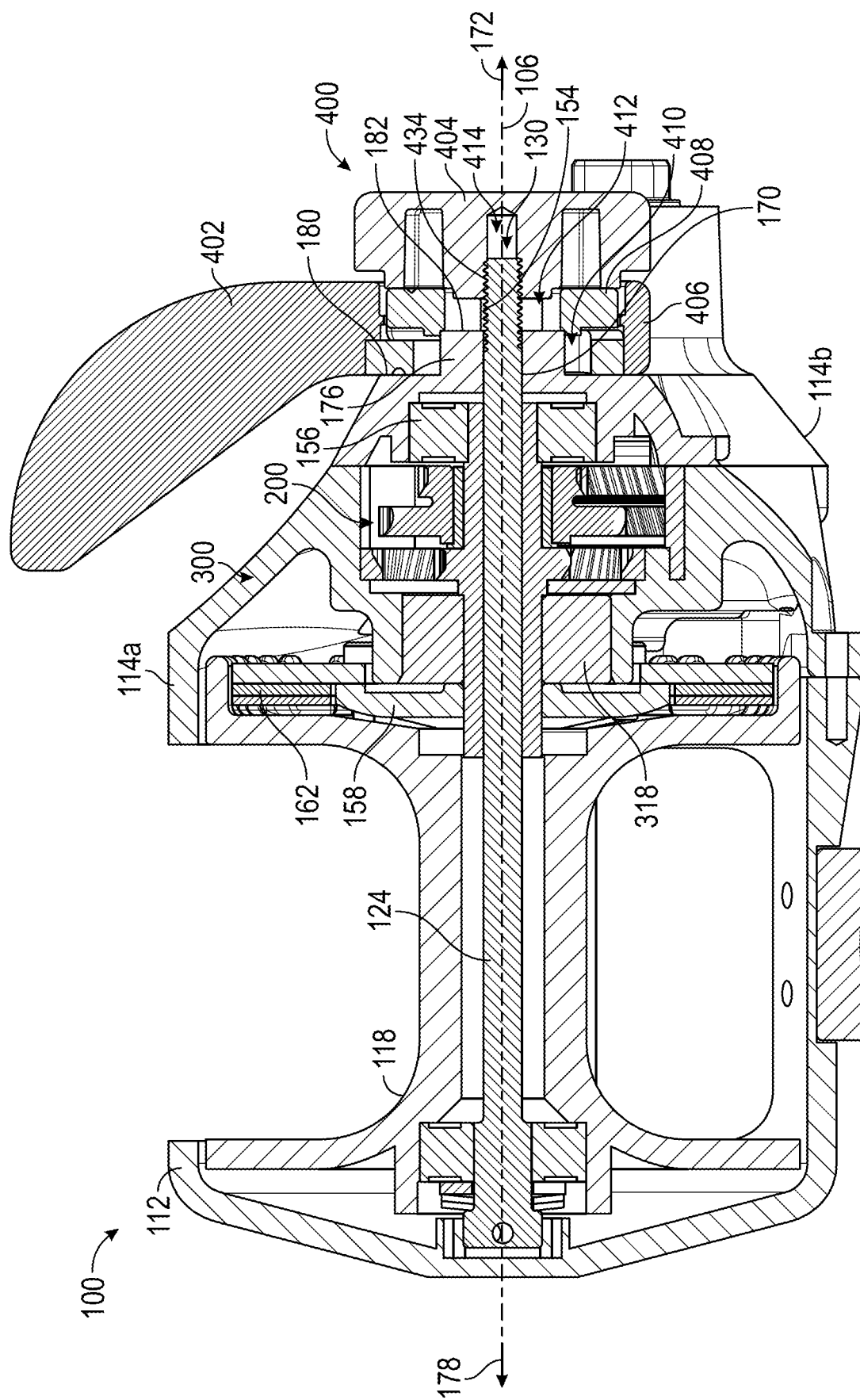
FIG. 9 is a side sectional view of the fishing reel of FIG. 1, including a lever mechanism for adjusting drag of the fishing reel, according to an exemplary embodiment.
Figure 10:
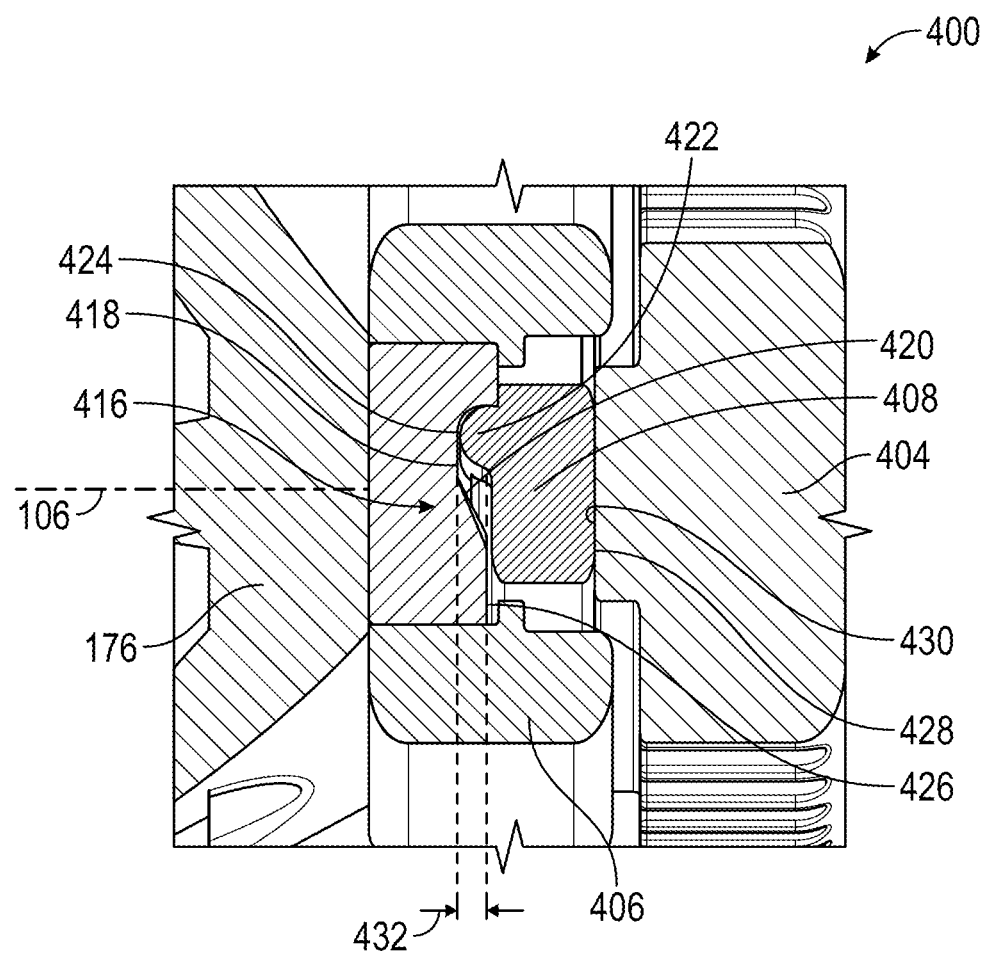
FIG. 10 is a side sectional view of a camming mechanism of the lever mechanism of FIG. 9, according to an exemplary embodiment.

Referring now to FIGS. 9 and 10, reel 100, or more particularly drive mechanism 300 may include a lever mechanism 400 (e.g., an adjustment mechanism, an adjustable drag mechanism, a lever assembly, etc.) for driving spindle 124 and spool 118 to translate along axis 106. Lever mechanism 400 includes a lever 402, an engagement member 406, a cam member 408, and an adjustment knob 404. Lever mechanism 400 is configured to receive an input from the fisherman (e.g., the fisherman's right hand or left hand) and rotate about axis 106 to operate the lever mechanism 400 (e.g., a camming mechanism of lever mechanism 400) to draw or translate spindle 124 along axis 106 in direction 172. The fisherman can operate lever mechanism 400 by rotating lever 402 in a first direction to draw spindle 124 (and spool 118) in direction 172, thereby increasing the compressive force between brake disc 162 and drag plate 158. The fisherman can operate lever mechanism 400 by rotating lever 402 in a second direction opposite the first direction to allow or drive spindle 124 and spool 118 to translate along axis 106 back to a rest position in direction 178.

Referring still to FIGS. 9 and 10, engagement member 406 may be integrally formed or fixedly coupled with lever 402 so that operation or rotation of lever 402 drives engagement member 406 to rotate about axis 106. Housing member 114b includes aperture 170 through which spindle 124 extends. Housing member 114b also includes an extrusion, a protrusion, a collar, a boss, etc., shown as boss 176 through which aperture 170 extends. Boss 176 can extend from second end 104 of housing member 114b and may be centered about axis 106. Boss 176 may be received within a central opening, an aperture, a hole, a bore, etc., shown as central aperture 410 of engagement member 406. Engagement member 406 may be configured to directly abut, contact, engage, etc., a lateral surface 180 of housing member 114b. In some embodiments, engagement between engagement member 406 and lateral surface 180 provides a reactionary force for driving or translating spindle 124 and spool 118 along axis 106 (e.g., in direction 172).

According to the exemplary embodiment shown in FIG. 9, cam member 408 includes a central opening, a bore, an aperture, a hole, etc., shown as central aperture 412 through which first end 130 of spindle 124 passes. Cam member 408 is configured to engage, abut, contact, directly touch, directly engage, etc., a shoulder or step 182 of boss 176. In other embodiments, cam member 408 is configured to engage a laterally outwards facing surface of boss 176 (e.g., a surface or face that points in direction 172 or along axis 106). Cam member 408 is also configured to abut, engage, directly contact, etc., adjustment knob 404. Cam member 408 engages boss 176 and engagement member 406 on one side (e.g., a reel or housing facing side) and engages adjustment knob 404 on an opposite side (e.g., an outer side, an outwards facing side, etc.). In this way, cam member 408 is sandwiched between engagement member 406 and adjustment knob 404 as shown in FIG. 9.

According to the exemplary embodiment shown in FIG. 10, a cam mechanism of lever mechanism 400 is shown in greater detail, according to an exemplary embodiment. As shown in FIG. 10, engagement member 406 includes a cam surface 416. Cam surface 416 can be formed in engagement member 406 at a radially offset position about axis 106. Cam surface 416 can include a first flat surface 418 (e.g., a generally planar or flat surface) and an angled surface 420. Angled surface 420 is angled relative to first flat surface 418.

Cam member 408 includes a camming member 422 (e.g., a protrusion, an extrusion, a tab, etc.) that is configured to ride along, engage with, translate along, etc., cam surface 416. In some embodiments, camming member 422 rides along cam surface 416 as lever 402 is driven by the fisherman to rotate about axis 106. Driving lever 402 to rotate about axis 106 (e.g., in a clockwise or anti-clockwise direction) causes engagement member 406 to rotate about axis 106 relative to cam member 408, thereby driving camming member 422 to ride along cam surface 416. Cam surface 416 also includes a second flat surface 426. Camming member 422 can include an engagement surface 424 that is configured to directly contact, abut, engage, etc., cam surface 416. Engagement member 406 can be rotatable or transitionable between a first angular position such that camming member 422 engages cam surface 416 at first flat surface 418 and a second angular position such that camming member 422 engages cam surface 416 at second flat surface 426. Rotating engagement member 406 between the first angular position and the second angular position causes camming member 422 to ride along first flat surface 418, angled surface 420, and second flat surface 426. When the cam member 408 transitions from engaging the first flat surface 418 and the second flat surface 426, a distance along axis 106 between engagement member 406 and cam member 408 increases.

Cam member 408 defines a surface 428 that is configured to engage, abut, directly contact, etc., a corresponding surface 430 of adjustment knob 404. In some embodiments, surface 428 and surface 430 are slidably coupled with each other. As cam member 408 is driven to translate relative to engagement member 406 along axis 106, adjustment knob 404 is also configured to translate relative to engagement member 406 and boss 176 along axis 106. In some embodiments, first flat surface 418 and second flat surface 426 are a distance 432 apart along axis 106. Transitioning lever 402 and engagement member 406 between the first angular position and the second angular position (e.g., to transition camming member 422 between the first flat surface 418 and the second flat surface 426) results in cam member 408 and adjustment knob 404 being translated relative to housing member 114b the distance 432.

Referring again to FIG. 9 adjustment knob 404 is shown to include a central opening, a central aperture, a hole, a bore, a blind hole, an inner volume, etc., shown as central aperture 414. Central aperture 414 is configured to receive the first end 130 of spindle 124 therewithin. In some embodiments, adjustment knob 404 includes internal threads 434 that are positioned along a radially inwards facing surface defined by central aperture 414. Internal threads 434 are configured to engage or threadingly couple with threads 154 of spindle 124. In this way, translation of adjustment knob 404 relative to boss 176 or housing member 114b results in translation of spindle 124 and spool 118 relative to shaft collar 216 and drag plate 158.

In this way, transitioning lever 402 between the first angular position and the second angular position changes the compressive force $F_{comp}$ between a first value, $F_{comp,1}$ and a second value $F_{comp,2}$, where the second value is greater than the first value (e.g., $F_{comp,2} > F_{comp,1}$). In some embodiments, adjustment knob 404 can operate or function similarly to adjustment member 186. Adjustment knob 404 may be rotated relative to cam member 408 in either direction about axis 106 to drive spindle 124 and spool 118 to translate relative to shaft collar 216 and drag plate 158, thereby adjusting the compressive force $F_{comp}$. In some embodiments, rotating adjustment knob 404 in a first direction relative to cam member 408 about axis 106 results in spindle 124 and spool 118 being translated relative to shaft collar 216 and drag plate 158, thereby increasing both the first value $F_{comp,1}$ and the second value $F_{comp,2}$ of the compressive force $F_{comp}$. Similarly, rotating adjustment knob 404 in a second direction about axis 106 that is opposite the first direction results in spindle 124 and spool 118 translating in direction 178 relative to shaft collar 216 and drag plate 158, thereby decreasing both the first value $F_{comp,1}$ and the second value $F_{comp,2}$ of the compressive force $F_{comp}$. In this way, lever mechanism 400 can incorporate adjustable drag or compressive force $F_{comp}$ through the use of an adjustment knob and the use of a camming mechanism. The camming mechanism facilitates a discrete increase or decrease in the compressive force (e.g., between a first value and a second value), while the adjustment knob facilitates continuous adjustment of the compressive force (or continuous adjustment of the first value and the second value).

It should be understood that while lever mechanism 400 is described as being transitioned between a first angular position and a second angular position (e.g., corresponding to engagement between camming member 422 and first flat surface 418 and engagement between camming member 422 and second flat surface 426), lever mechanism 400 may include a camming mechanism with more than two predefined positions. For example, in other embodiments, cam surface 416 includes three or more flat surfaces, with angled surfaces between each of the neighboring flat surfaces so that the lever mechanism 400 is transitionable between three or more predefined positions. Advantageously, the adjustment knob 404 can be used to preset a position of spool 118 to optimize an effect that lever 402 has on drag.

Operation and Drag

Figure 11:
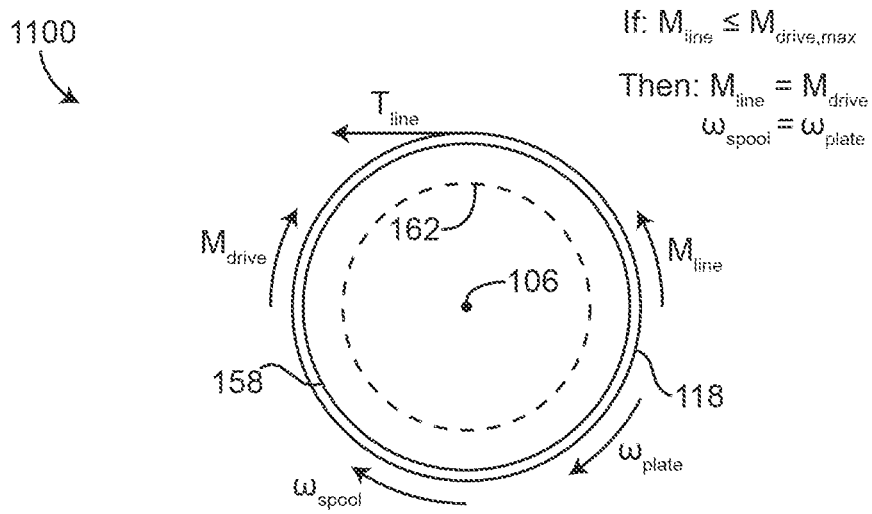
FIG. 11 is a diagram illustrating operation of a drag plate and a spool of the fishing reel of FIG. 1 when a torque exerted by fishing line does not exceed a maximum torque, according to an exemplary embodiment.
Figure 12:
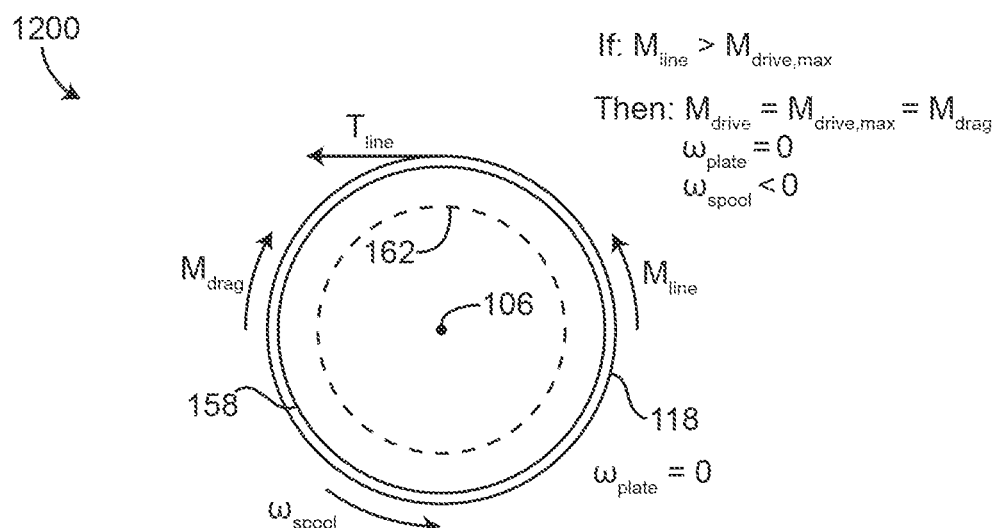
FIG. 12 is a diagram illustrating operation of operation of the drag plate and the spool of the fishing reel of FIG. 1 when the torque exerted by the fishing line exceeds the maximum torque, according to an exemplary embodiment.

According to the exemplary embodiment shown in FIGS. 11 and 12, diagrams 1100 and 1200 show a driving and drag operation of reel 100 when reel 100 operates to take-up fishing line 132. As shown in diagram 1100, fishing line 132 may experience a tension $T_{line}$ (e.g., due to water drag on line 132, a fish or aquatic animal wrangled at an end of line 132, etc.). The tension $T_{line}$ is transferred to spool 118, thereby resulting in a rotational moment about axis 106 in a first direction (e.g., a negative direction), shown as $M_{line}$. Spool 118 is driven through the frictional engagement between brake disc 162 and drag plate 158. An input torque is received through handle 190, which is transferred through the gear set 200, drag plate 158 and brake disc 162 to spool 118. The input torque may be increased or decreased as it is transferred through the gear set 200, the drag plate 158, and the brake disc 162, and is provided to the spool 118 in a second direction (e.g., a positive direction), shown as $M_{drive}$.

A maximum drive moment that can be provided to spool 118 is referred to as $M_{drive,max}$. In some embodiments, the maximum drive moment $M_{drive,max}$ is directly related to the frictional engagement between the brake disc 162 and drag plate 158. The maximum drive moment $M_{drive,max}$ can be defined based on the compressive force between the brake disc 162 and the drag plate 158, $F_{comp}$, a cross-sectional area of engagement between the brake disc 162 and the drag plate 158, $A_s$, an inner and outer radius or diameter of the brake disc 162, and a coefficient of friction (e.g., static) μ of the material of brake disc 162 and/or the material of drag plate 158. The compressive force $F_{comp}$ can be adjusted, as described in greater detail above (e.g., by translating spindle 124 and spool 118 along axis 106 in either direction 172 or direction 178) by rotating lever 402, rotating adjustment knob 404, or rotating adjustment member 186, thereby adjusting the maximum drive moment $M_{drive,max}$.

If the moment $M_{line}$ less than or equal to the maximum drive moment $M_{drive,max}$ is the drive moment $M_{drive}$ is equal to the moment $M_{line}$ and both the spool 118 and the drag plate 158 rotate in unison about axis 106 in the same direction and at the same speed (e.g., $\omega_{spool}=\omega_{plate}$, where $\omega_{spool}$ is the angular speed and direction of spool 118, and $\omega_{plate}$ is the angular speed and direction of drag plate 158). In this way, the spool 118 is driven to take up fishing line 132 and wind the fishing line 132 onto spool 118, as long as the moment $M_{line}$ produced by the tension in line 132 does not exceed the maximum drive moment $M_{drive,max}$.

If the moment $M_{line}$ exceeds the maximum drive moment $M_{drive,max}$, then spool 118 may rotate in a let out direction (e.g., counter-clockwise as shown in diagram 1200 of FIG. 12, or a direction of the moment $M_{line}$ about axis 106) at $\omega_{spool}$ while the drag plate 158 does not rotate (e.g., $\omega_{plate}=0$). Since drag plate 158 is rotatably fixedly coupled with shaft collar 216, and shaft collar 216 is rotatably coupled with one-way bearing 318 (see e.g., FIG. 5), drag plate 158 may rotate in the take-up direction but is prevented from rotating in the let-out direction. However, spool 118 may rotate in the let-out direction (shown in FIG. 12) if the moment $M_{line}$ exceeds the maximum drive moment $M_{drive,max}$. When spool 118 rotates in the let-out direction and drag plate 158 does not, the drive moment $M_{drive}$ functions as a drag moment $M_{drag}$, opposing the direction of rotation of spool 118. The drag moment $M_{drag}$ is substantially equal to the maximum drive moment $M_{drive,max}$.

In this way, drag plate 158 can function both as a drive member (e.g., as shown in diagram 1100 of FIG. 11) and as a drag member (e.g., as shown in diagram 1200 of FIG. 12). Referring again to FIGS. 9-10, transitioning lever 402 between the first angular position and the second angular position may transition reel 100 between the take-up configuration and the let-out configuration. The first angular position of the lever 402 is associated with the lower value of the compressive force, and may be the let-out position. For example, the compressive force between the brake disc 162 and the drag plate 158 may be substantially zero, or relatively low, thereby allowing the spool 118 to rotate freely relative to the drag plate 158 (e.g., for casting operations). Similarly, the compressive force between the brake disc 162 and the drag plate 158 may be significantly greater than zero when the lever 402 is in the second angular position.

Concentric Driveline and Drag

Referring to FIGS. 2-9 and 11-12, rotational kinetic energy is transferred from handle 110 to spool 118 through gear set 200, drag plate 158, and brake disc 162. Gear set 200, drag plate 158, and brake disc 162 may define a driveline or a drivetrain (e.g., a drive mechanism 300 as shown in FIG. 9) between handle 110 and spool 118. The drive mechanism 300 can also include lever mechanism 400, and/or any components of reel 100 for adjusting drag exerted on spool 118 (e.g., drag plate 158 and brake disc 162). Advantageously, the various components of the driveline are concentric with each other. Specifically, the rotatable member (e.g., shaft collar 216) that drives spool 118 through drag plate 158 and brake disc 162 is concentric (e.g., centered about a same axis) with axis 106 about which spool 118 is driven to rotate. Advantageously, the reel 100 described herein provides a concentric driveline, which facilitates a more compact reel 100. In embodiments where gear set 300 is a variator gear set (as described in greater detail above with reference to FIGS. 13-14), handle 110 may be positioned at axis 106 so that handle 110 is configured to input rotational kinetic energy to gear set 300 about axis 106 (a same axis that spool 118 rotates about).

Additionally, the reel 100 as described herein provides the fisherman with adjustable drag. The fisherman may adjust the drag to a desired setting by actuating lever 402, and/or by adjusting adjustment knob 404 (or adjustment member 186). The drag is adjusted by pulling the spool 118 towards drag plate 158 (e.g., either by operating lever 402 and/or by adjusting or rotating adjustment knob 404).

Advantageously, reel 100 uses a concentric driveline with adjustable drag features as described herein. Reel 100 facilitates providing a high gear ratio (e.g., a gear ratio of 10:1) between spool 118 and handle 110 with a reduced footprint or size. A higher gear ratio facilitates retrieving a lure at a faster speed. For example, a reel with an 8:1 gear ratio may retrieve the lure at a speed 33% faster than a reel with a 6:1 ratio.

Spool Translation and Compressive/Tensile Forces

Referring now to FIGS. 2, 5, 6, 8 and 9, spindle 124 is configured to translate in direction 172 (e.g., towards drag plate 158) to increase the drag. As described in greater detail above, this can be achieved by using a cam mechanism, a threaded fastener, or a combination thereof. When spindle 124 and spool 118 are drawn in direction 172, spool 118 is compressed into drag plate 158. Specifically, spindle 124 applies a compressive force to spool 118 and drag plate 158 provides a reactive force to an opposite side of spool 118. In this way, spool 118 is translated towards drag plate 158, as opposed to drag plate 158 being pushed into spool 118. Pulling spool 118 into compression with drag plate 158 results in a compressive force being applied between first body portion 112, housing member 114a, housing member 114b, and supports 116. Advantageously, the housing of reel 100 (e.g., first body portion, housing member 114a, housing member 114b, and supports 116) may be better suited for compressive loads as opposed to tensile loads.

Pulling the spool 118 from the first end 102 of reel 100 allows spindle 124 to pass directly through spool 118 and through a center of gear set 300. Advantageously, this can reduce a number of components and space required to achieve a drag system.

Spindle 124 passes through inner volume 310 of spool 118 to engage spool 118 at first end 102. As spindle 124 is translated in direction 172 and spool 118 undergoes compressive loading, spindle 124 is loaded in tension. Advantageously, spindle 124 may be better suited to tensile loads, since compressive loads may result in spindle 124 failing or buckling.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A fishing rod assembly, comprising:
   a rod; and
   a reel assembly, comprising:
      a housing;
      a spool positioned within the housing, the spool configured to rotate about an axis to retrieve or let out a fishing line;
      a drive mechanism concentric with the axis comprising a planetary gear set and a spindle extending centrally through a sun gear of the planetary gear set and an inner volume of the spool, the drive mechanism configured to receive rotational kinetic energy from a user and drive the spool to take-up fishing line when a counter-torque provided to the spool by the fishing line is less than a maximum torque;
      a drag mechanism configured to be driven by the drive mechanism and at least one of (a) drive the spool to take-up the fishing line when the counter-torque provided to the spool by the fishing line is less than the maximum torque or (b) provide a drag force to the spool when the counter-torque provided to the spool by the fishing line is less than the maximum torque;
      wherein the spindle comprises a stepped end that engages the spool and is configured to be driven to pull the spool to adjust a drag on the spool.

2. The fishing rod assembly of claim 1, wherein
   the planetary gear set is configured to receive the rotational kinetic energy from the user and drive the spool through a shaft collar;
   the spindle extends through an inner volume of the spool and a central bore of the shaft collar, wherein the spindle is configured to rotate relative to the shaft collar; and
   wherein the drive mechanism further comprises a one-way bearing positioned within the housing and configured to receive the shaft collar through a central opening, the one-way bearing configured to allow the shaft collar to rotate in a direction to take-up fishing line, and limit rotation in an opposite direction.

3. The fishing rod assembly of claim 2, wherein the drag mechanism comprises:
   a drag plate rotatably fixedly coupled with the shaft collar, the drag plate defining an engagement face;
   a brake pad mounted on a corresponding surface of the spool, the brake pad defining an engagement surface directly adjacent the engagement face of the drag plate, wherein the drag plate and the brake pad are configured to frictionally engage each other at a compressive force to define the maximum torque.

4. The fishing rod assembly of claim 3, wherein the spool and the drag plate are configured to rotate in unison in a same direction to take-up the fishing line when the counter-torque provided to the spool by the fishing line is less than the maximum torque.

5. The fishing rod assembly of claim 3, wherein the spool is configured to rotate to let-out the fishing line and the drag plate is configured to remain rotatably stationary when the counter-torque provided to the spool by the fishing line is greater than the maximum torque.

6. The fishing rod assembly of claim 3, wherein the one-way bearing, the spindle, the planetary gear set, the spool, the brake pad, and the drag plate are concentrically positioned about the axis.

7. The fishing rod assembly of claim 3, further comprising an adjustment mechanism, the adjustment mechanism configured to adjustably draw the spindle to pull the spool and the brake pad into compressive engagement with the drag plate to adjust the maximum torque and the drag force.

8. The fishing rod assembly of claim 1, wherein the drive mechanism and the drag mechanism are concentric with each other about the axis.

9. The fishing rod assembly of claim 1, wherein the drag force provided to the spool is proportional to the maximum torque.

10. A fishing reel comprising:
a housing;
a spool positioned within the housing, the spool configured to rotate about an axis to retrieve a fishing line;
a drive mechanism concentric with the axis comprising a planetary gear set and a spindle extending centrally through a sun gear of the planetary gear set and an inner volume of the spool, the drive mechanism configured to receive rotational kinetic energy from a user and drive the spool to take-up fishing line when a counter-torque provided to the spool by the fishing line is less than a maximum torque;
a drag mechanism configured to be driven by the drive mechanism and at least one of drive the spool to take-up the fishing line when the counter-torque provided to the spool by the fishing line is less than the maximum torque or provide a drag force to the spool when the counter-torque provided to the spool by the fishing line is less than the maximum torque;
wherein the spindle comprises a stepped end that engages the spool and is configured to be driven to pull the spool to adjust a drag on the spool.

11. The fishing reel of claim 10, wherein:
the planetary gear set is configured to receive the rotational kinetic energy from the user and drive the spool through a shaft collar;
the spindle extends through the inner volume of the spool and a central bore of the shaft collar, wherein the spindle is configured to rotate relative to the shaft collar; and
wherein the drive mechanism comprises a one-way bearing positioned within the housing and configured to receive the shaft collar through a central opening, the one-way bearing configured to allow the shaft collar to rotate in a direction to take-up fishing line, and limit rotation in an opposite direction.

12. The fishing reel of claim 11, wherein the drag mechanism comprises:
a drag plate rotatably fixedly coupled with the shaft collar, the drag plate defining an engagement face;
a brake pad mounted on a corresponding surface of the spool, the brake pad defining an engagement surface directly adjacent the engagement face of the drag plate, wherein the drag plate and the brake pad are configured to frictionally engage each other at a compressive force to define the maximum torque.

13. The fishing reel of claim 12, wherein the spool and the drag plate are configured to rotate in unison in a same direction to take-up the fishing line when the counter-torque provided to the spool by the fishing line is less than the maximum torque.

14. The fishing reel of claim 12, wherein the spool is configured to rotate to let-out the fishing line and the drag plate is configured to remain rotatably stationary when the counter-torque provided to the spool by the fishing line is greater than the maximum torque.

15. The fishing reel of claim 12, wherein the one-way bearing, the spindle, the planetary gear set, the spool, the brake pad, and the drag plate are concentrically positioned about the axis.

16. The fishing reel of claim 12, further comprising an adjustment mechanism, the adjustment mechanism configured to adjustably draw the spindle to pull the spool and the brake pad into compressive engagement with the drag plate to adjust the maximum torque and the drag force.

17. The fishing reel of claim 10, wherein the drive mechanism and the drag mechanism are concentric with each other about the axis.

18. The fishing reel of claim 10, wherein the drag force provided to the spool is proportional to the maximum torque.

19. A driveline for a spool of a fishing reel, the driveline comprising:
a drive mechanism comprising a planetary gear set and a spindle extending centrally through a sun gear of the planetary gear set and an inner volume the spool, the drive mechanism concentric with the axis, the drive mechanism configured to receive rotational kinetic energy from a user and drive a spool through a frictional engagement between a drag plate and a brake pad to take-up fishing line when a counter-torque provided to the spool by the fishing line is less than a maximum torque;
a drag mechanism configured to be driven by the drive mechanism and at least one of drive the spool to take-up the fishing line when the counter-torque provided to the spool by the fishing line is less than the maximum torque or provide a drag force to the spool when the counter-torque provided to the spool by the fishing line is less than the maximum torque;
wherein the spindle comprises a stepped end that engages the spool and is configured to be driven to pull the spool to adjust a drag on the spool.

20. The driveline of claim 19, wherein the spool and the drag plate are configured to rotate in unison in a same direction to take-up the fishing line when the counter-torque provided to the spool by the fishing line is less than the maximum torque.

* * * * *